US011667405B2

(12) United States Patent
Palmer

(10) Patent No.: US 11,667,405 B2
(45) Date of Patent: Jun. 6, 2023

(54) VEHICLE LAUNCH SYSTEM AND METHOD

(71) Applicant: 8 Rivers Capital, LLC, Durham, NC (US)

(72) Inventor: Miles R. Palmer, Chapel Hill, NC (US)

(73) Assignee: 8 Rivers Capital, LLC, Durham, NC (US)

(*) Notice: Subject to any disclaimer, the term of this patent is extended or adjusted under 35 U.S.C. 154(b) by 1216 days.

(21) Appl. No.: 15/840,769

(22) Filed: Dec. 13, 2017

(65) Prior Publication Data
US 2019/0023414 A1  Jan. 24, 2019

Related U.S. Application Data

(60) Provisional application No. 62/433,558, filed on Dec. 13, 2016.

(51) Int. Cl.
*B64G 1/00* (2006.01)
*B64G 5/00* (2006.01)
(Continued)

(52) U.S. Cl.
CPC .............. *B64G 1/002* (2013.01); *B64F 1/025* (2013.01); *B64F 1/04* (2013.01); *B64G 5/00* (2013.01); *F41A 1/02* (2013.01); *F41B 11/62* (2013.01); *F41B 11/68* (2013.01); *F41B 11/723* (2013.01); *F42B 12/02* (2013.01)

(58) Field of Classification Search
CPC . B64F 1/04; B64F 1/025; B64G 1/002; B64G 5/00; F41A 1/02; F41B 11/62; F41B 11/68; F41B 11/723; F42B 30/00; F42B 12/02
See application file for complete search history.

(56) References Cited

U.S. PATENT DOCUMENTS 2,790,354 A    4/1957  Yoler
2,843,343 A *  7/1958  Ward ...................... B64F 1/06
                                                  244/63
(Continued)

FOREIGN PATENT DOCUMENTS

GB    1 073 144    6/1967
GB    2 233 076    1/1991
(Continued)

OTHER PUBLICATIONS

Bruckner et al., "Investigation of Advanced Propulsion Technologies: The RAM Accelerator and the Flowing Gas Radiation Heater," *NASA Grant No. NAG 1-1288 Final Report, Aerospace and Energetics Research Program, Department of Aeronautics and Astronautics, University of Washington*, Seattle, WA, 1992, Retrieved from the Internet, URL: https://ntrs.nasa.gov/archive/nasa/casi.ntrs.nasa.gov/19960009441.pdf.
(Continued)

*Primary Examiner* — Benjamin P Lee
(74) *Attorney, Agent, or Firm* — Womble Bond Dickinson (US) LLC

(57) ABSTRACT

The present disclosure relates to a launch system and method. The launch system and method can include at least a preliminary accelerator tube system (PAT) that can be combined with a main accelerator tube system (MAT). The PAT alone or combined with the MAT can be used for launch of a vehicle for testing and/or for delivery of a payload.

30 Claims, 17 Drawing Sheets

(51) Int. Cl.
*F41A 1/02* (2006.01)
*F41B 11/62* (2013.01)
*F41B 11/68* (2013.01)
*F41B 11/723* (2013.01)
*B64F 1/02* (2006.01)
*B64F 1/04* (2006.01)
*F42B 12/02* (2006.01)

(56) References Cited

U.S. PATENT DOCUMENTS

| | | | |
|---|---|---|---|
| 3,016,693 A | 1/1962 | Jack et al. | |
| 3,131,597 A | 5/1964 | Gran, Jr. et al. | |
| 3,138,352 A * | 6/1964 | Saholt | B64F 1/06 244/63 |
| 3,369,455 A | 2/1968 | Jones | |
| 3,374,668 A | 3/1968 | Godfrey | |
| 3,583,161 A | 6/1971 | Simms | |
| 3,940,981 A | 3/1976 | Covey et al. | |
| 4,347,463 A | 8/1982 | Kemeny et al. | |
| 4,369,691 A | 1/1983 | Baehr, Jr. et al. | |
| 4,480,523 A | 11/1984 | Young et al. | |
| 4,577,461 A | 3/1986 | Cann | |
| 4,590,842 A | 5/1986 | Goldstein | |
| 4,677,895 A | 7/1987 | Carlson et al. | |
| 4,715,261 A | 12/1987 | Goldstein | |
| 4,796,511 A | 1/1989 | Eyssa | |
| 4,821,509 A | 4/1989 | Burton et al. | |
| 4,957,035 A | 9/1990 | Eskam | |
| 4,967,637 A | 11/1990 | Löffler et al. | |
| 4,974,487 A | 12/1990 | Goldstein | |
| 5,012,719 A | 5/1991 | Goldstein | |
| 5,024,137 A | 6/1991 | Schroeder | |
| 5,033,355 A | 7/1991 | Goldstein | |
| 5,072,647 A | 12/1991 | Goldstein et al. | |
| 5,097,743 A * | 3/1992 | Hertzberg | F41A 1/02 60/767 |
| 5,171,932 A | 12/1992 | McEhoy | |
| 5,183,956 A | 2/1993 | Rosenberg | |
| 5,233,903 A | 8/1993 | Saphier | |
| 5,429,030 A | 7/1995 | Tidman | |
| 5,485,721 A | 1/1996 | Steenborg | |
| 5,640,843 A | 6/1997 | Aston | |
| 5,695,153 A * | 12/1997 | Britton | B64F 1/04 124/63 |
| 6,276,353 B1 * | 8/2001 | Briggs | F41B 11/57 124/71 |
| 6,311,926 B1 | 11/2001 | Powell | |
| 6,895,743 B1 | 5/2005 | McElheran | |
| 6,921,051 B2 | 7/2005 | Lopata et al. | |
| 6,993,898 B2 | 2/2006 | Parkin | |
| 7,246,483 B2 | 7/2007 | Minick et al. | |
| 7,775,148 B1 | 8/2010 | McDermott | |
| 8,746,120 B1 | 6/2014 | Nolting | |
| 2004/0139723 A1 | 7/2004 | Parkin | |
| 2004/0156400 A1 | 8/2004 | Caplan et al. | |
| 2011/0259230 A1 | 10/2011 | Sawka et al. | |
| 2012/0175457 A1 | 7/2012 | Hunter | |
| 2012/0187249 A1 | 7/2012 | Hunter et al. | |
| 2012/0227374 A1 | 9/2012 | Zegler | |
| 2014/0306064 A1 * | 10/2014 | Palmer | F42C 11/00 244/171.1 |
| 2014/0306065 A1 | 10/2014 | Palmer | |
| 2015/0175278 A1 | 6/2015 | Hunter | |
| 2015/0307213 A1 | 10/2015 | Hunter | |
| 2016/0231217 A1 * | 8/2016 | Lamberson | G01N 3/307 |
| 2017/0307313 A1 * | 10/2017 | Knowlen | F41A 1/02 |
| 2018/0244402 A1 * | 8/2018 | Kahlon | B64F 1/04 |

FOREIGN PATENT DOCUMENTS

| | | |
|---|---|---|
| JP | H028695 | 1/1990 |
| JP | H0343678 | 2/1991 |
| JP | H0486496 | 3/1992 |
| JP | H05-322486 | 12/1993 |
| JP | H05320910 | 12/1993 |
| JP | H0610766 | 1/1994 |
| JP | H0646539 | 2/1994 |
| JP | H07133757 | 5/1995 |
| JP | H0874731 | 3/1996 |
| JP | H08273622 | 10/1996 |
| JP | 2001132542 | 5/2001 |
| JP | 2005042721 | 2/2005 |
| JP | 2007513308 | 5/2007 |
| JP | 2008512978 | 4/2008 |
| JP | 2008517199 | 5/2008 |
| JP | 2009083954 | 4/2009 |
| JP | 2009096441 | 5/2009 |
| JP | 2010275929 | 12/2010 |
| JP | 2011207401 | 10/2011 |
| JP | 2013536917 | 9/2013 |
| JP | 3203343 | 3/2016 |
| WO | WO 2005/054674 | 6/2005 |
| WO | WO 2006/088584 | 8/2006 |
| WO | WO 2008/010180 | 1/2008 |
| WO | WO 2011/038365 | 3/2011 |
| WO | WO 2012/030820 | 3/2012 |
| WO | WO 2014/152778 | 9/2014 |

OTHER PUBLICATIONS

Coppa et al., "Mach One Impact Test Apparatus Utilizing an 18.4-mm-Bore Gas Gun With a Novel Decelerating Device," 1979, pp. 824-828, vol. 50, No. 824. URL: https://doi.org/10.1063/1.1135958.

De Icaza et al, "Design Operation and Test of a Light Gas Gun in a Developing Country", *Review of Scientific Instruments*, 1989, pp. 3284-3292, vol. 60, No. 10.

"One Stage Light Gas Gun", Internet Citation, 2004 URL: http//www.islandone.org/LEOBiblio/SPBI107.HTM.

Pavlenko et al. "A One-Stage Light-Gas Gun for Studying Dynamic Properties of Structural Materials in a Range up to 40 GPa," *Instruments and Experimental Techniques, Consultants Bureau*, 2013, pp. 482-484, vol. 56, No. 4, New York.

Allam et al., "High Efficiency and Low cost of Electricity Generation from Fossil Fuels While Eliminating Atmosperic Emissions, Including Carbon Dioxide," *Energy Procedia*, 2012, pp. 1-12.

Author Unknown, "The SHARP Gas Gun," *Energy & Technology Review*, Jul. 1993, pp. 1-12.

McNab, "Launch to Space With an Electromagnetic Railgun," *IEEE Transactions on Magnetics*, 2003, pp. 295-304, vol. 39, No. 1.

Palmer et al., "High Temperature Superconductor Applications in Electromagnetic Space Launch," *Progress in High Temerature Superonductivity*, vol. 8 Wolrld Scientific Publ., Teaneck, NJ, 1988, p. 168-173.

Palmer et al., Electromagnetic Space Launch: A Re-evaluation in Light of Current Technology and Launch Needs and Feasibility of a Near Term Demonstration, *IEEE Transactions on Magnetics*, vol. 25, No. 1, Jan. 1989, pp. 393-399.

Palmer et al. "A Revolution in Access to Space Through Spinoffs of SDI Technology," Keynote Paper, 5$^{th}$ Symposium on Electromagnetic Launch Technology, Destin, Florida, Apr. 1990, *IEEE Transaction on Magnetics*, vol. 27, No. 1, Jan. 1991, p. 11-20.

Palmer, "Synergism in Research and Development Between Electromagnetic Guns and Spacecraft Electric Propulsion," *EIII Transactions on Magnetics*, 1993, vol. 29, No. 1. pp. 706-710.

Palmer, "Implications of Gun Launch to Space for Nanosatellite Architectures," *Proceedings of the International Conference on Integrated Micro/Nanotechnology for Space Applications*, Houston, Texas, Oct. 30, 1995, 6 pages.

Palmer, "Economics and Technology Issues for gun Launch to Space," *Space Technology International Forum*, 1996, Albuquerque, New Mexico, 6 pages.

Palmer, "Market, Cost, and Technical Factors Affecting Advanced Space Launch Technologies," *12$^{th}$ International Symposium on Electromagnetic Launch Technology*, Snow Bird, Utah, May 2005, 15 pages.

Palmer et al., "Component and Subscale Testing in Support of the Design of a Battery Power Supply for the Electromagnetic Gun

(56) References Cited

OTHER PUBLICATIONS

Research Facility," Presented Paper, IEEE Pulsed Power Conference, Washington, D.C., Jun. 29, 1987, pp. 46-49.
Palmer, "Midterm to Far Term Applications of Electromagnetic Guns and Associated Power Technology," Keynote paper, Applications Panel, 6$^{th}$ Symposium on Electromagnetic Launch Technology, Austin, Texas, Apr. 1992, published IEEE Transactions on Magnetics, 29(1) Jan. 1993, p. 345-348.
Palmer, "Motivation for a Near Term Gun Launch to Space Demonstration and a Variable Inductance Power Supply Concept to Minimize Initial Demonstration Costs," IEEE Transactions on Magnetics, vol. 29(1), Jan. 1993, p. 478-483.
Turman et al., "Co-Axial Geometry Electromagnetic Launch to Space," *AIAA Paper 94-4626, AIAA Apace Programs and Technologies Conference*, Hunsville, Alabama, Sep. 29, 1994, 15 pages. http://arc.aiaa.org, DOI No. 10.2514/6.1994-4626.
Walls et al, "Application of Electromagnetic Guns to Future Naval Platforms," *IEEE Transactions on Magnetics*, 1999, pp. 262-267, vol. 35, No. 1.

\* cited by examiner

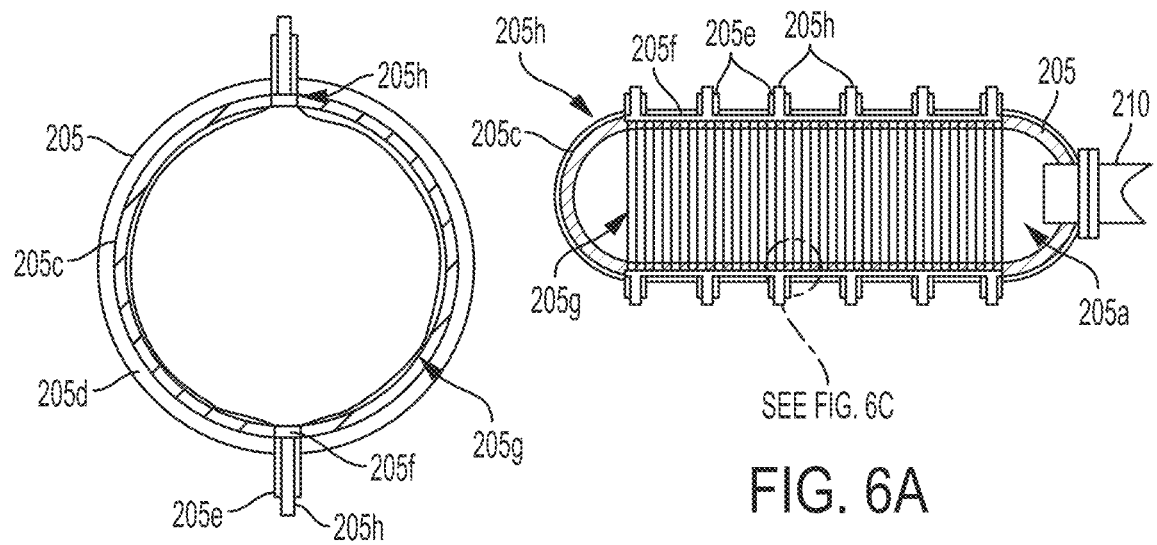
FIG. 6B
FIG. 6A
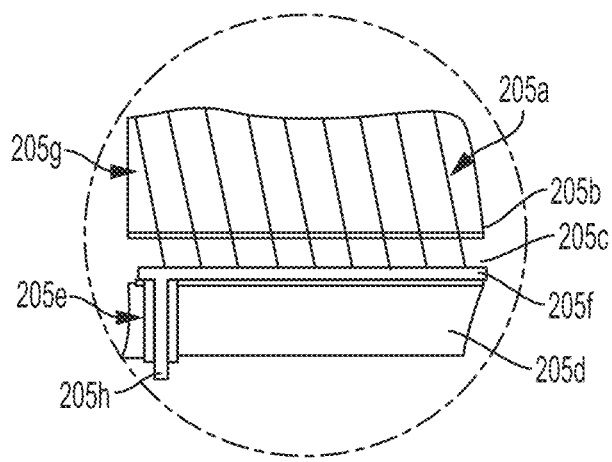
FIG. 6C

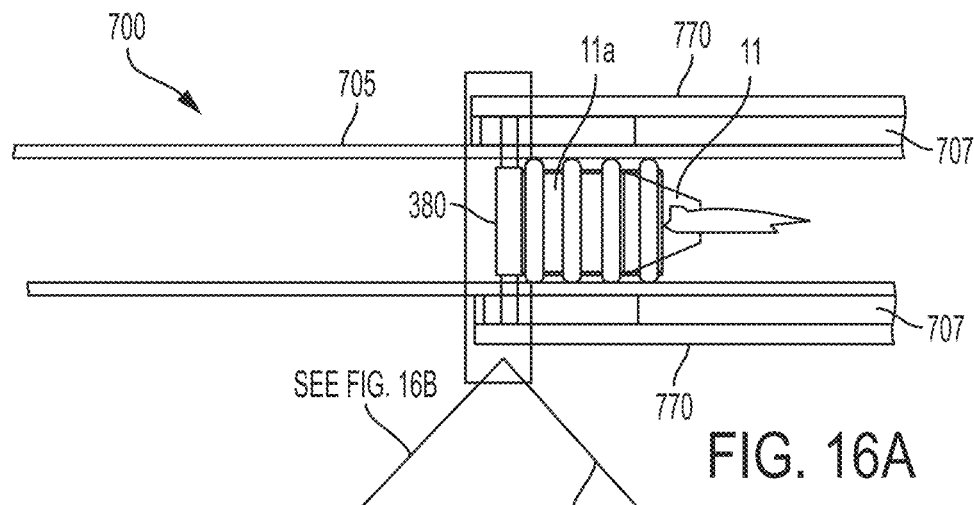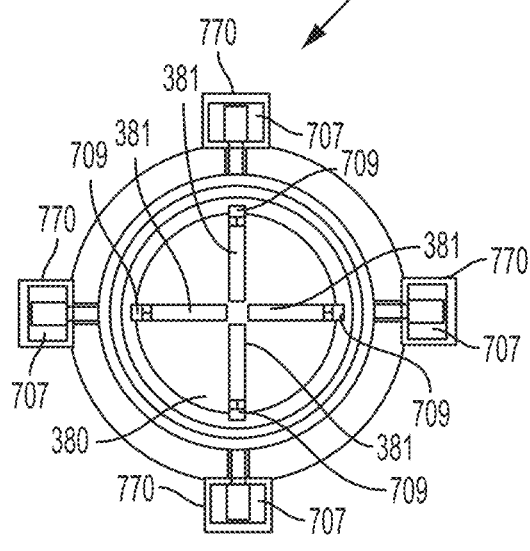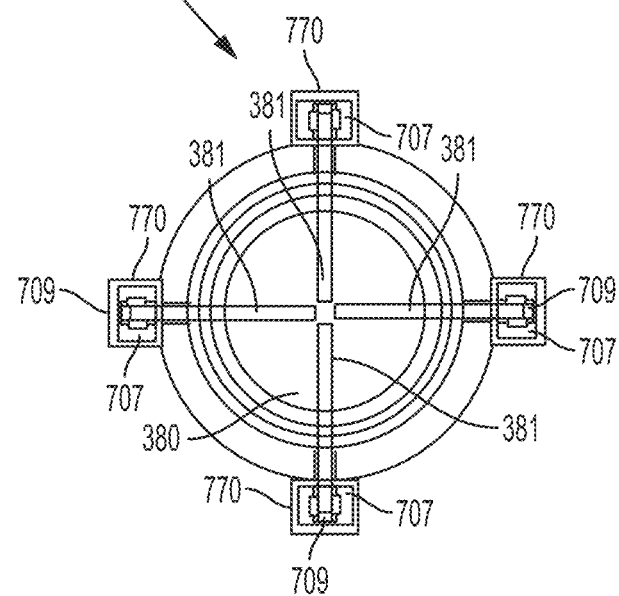

VEHICLE LAUNCH SYSTEM AND METHOD

CROSS-REFERENCE TO RELATED APPLICATIONS

The present application claims priority to U.S. Provisional Patent Application No. 62/433,558, filed Dec. 13, 2016, the disclosure of which is incorporated herein by reference.

FIELD OF THE DISCLOSURE

The present disclosure relates to systems, methods, and apparatuses for launch of a vehicle. More particularly, the present disclosure provides a launch system and method utilizing a pre-acceleration tube for rapid acceleration of a vehicle.

BACKGROUND

Existing light gas gun systems and associated soft catch systems are well known in the art. Examples include U.S. Pat. No. 3,678,745, U.S. Pat. No. 3,940,981, U.S. Pat. No. 7,954,413, U.S. Pat. No. 8,536,502, U.S. Pat. No. 8,979,033, and "Measurement of Acceleration Using an Instrumented Railgun Projectile", DTIC ADA253366, June 1992.

Prior art systems and methods suffer from at least the following limitations, many of which are inter-related to each other: 1) high gun accelerations; 2) high gun propelling pressures; 3) high chamber wall to diameter thickness ratios; 4) high launch tube wall to diameter thickness ratios; 5) limited launch tube diameters; 6) limited launch tube lengths; 7) limited projectile sizes and masses; 8) limited projectile velocities; 9) high soft catch decelerations; and 10) soft catch damage to the projectile.

These limitations prevent hypersonic testing from being done at larger or full scales except via rocket boosted free flight testing, which is very expensive and only allows for telemetry and long distance measurements. There is no provision for the detailed close up measurements possible with sophisticated ground based range instrumentation. Also, there can be commercial and military applications for rapid logistics delivery of high priority packages to long ranges in short times. There remains a need in the art for launch systems and methods that address one or more of the problems noted above.

SUMMARY OF THE DISCLOSURE

Launch vehicles, launch systems, and methods of launching a payload are described in U.S. Pat. No. 9,463,881 and U.S. Pat. No. 9,617,016, the disclosures of which are incorporated herein by reference. The present disclosure relates to launch systems and methods incorporating many of the same principles described therein. In particular, the present disclosure describes systems and methods whereby a launch vehicle is accelerated through a tube for contained or free flight launch. Further to what has been previously described, the present disclosure relates more specifically to individual elements of a launch tube system and related components. In particular, the present disclosure describes a Preliminary Accelerator Tube system (PAT) that can be used in combination with a Main Accelerator Tube system (MAT) for launch of a vehicle.

In one or more embodiments related to free flight release of vehicles (e.g., for logistics delivery), the vehicles can be launched at relatively small angles (e.g., about 1 degree above horizontal to about 20 degrees about horizontal), horizontally, or even on a relatively small downward trajectory (e.g., about 1 degree below horizontal to about 10 degrees below horizontal). Further suitable launch angles are further described herein. The free flying vehicle then uses its internal guidance, navigation, and control systems to pitch upward and sideways to the trajectory required to reach the desired end point at the end of its flight. Advantageously, there is no requirement for building of the launch system on the side of an incline or mountain, or suspended in water as in prior art systems. Building horizontally or with a downward incline requires the vehicle to actively pull up to prevent self-destruction, thus providing an additional method of ensuring a failsafe flight profile.

In various embodiments, the present launch systems and methods provide significant improvements in relation to limitations previously noted above. TABLE 1 provides exemplary improvements achieved by the present launch systems and methods and their approximate magnitudes according to embodiments of the present disclosure. The examples provided in TABLE 1, however, should be viewed as necessarily limiting the scope of the present disclosure. Rather, the disclosure encompasses all embodiments included herein. The present launch systems and methods particularly can enable lower cost, more frequent, and better testing and logistics delivery.

TABLE 1

| Parameter | Known Systems | Present Disclosure |
| --- | --- | --- |
| Acceleration | >2,000 G's | <2,000 G's (down to 2 G's) |
| Propelling Pressure | >10,000 PSI (>68 MPa) | <10,000 PSI (down to 10 PSI (0.068 MPa)) |
| Chamber Wall Thickness to Chamber Diameter Ratio | 0.1 to 10 | 0.0001 to 0.1 |
| Launch Tube Wall Thickness to Launch Tube Diameter Ratio | 0.1 to 10 | 0.0001 to 0.1 |
| Launch Tube Diameter | 0.01 to 16 in (0.0254 to 40.64 cm) | 16 to 1600 in (40.64 cm to 40.64 m) |
| Launch Tube Length | 1 to 1,000 ft (0.305 to 305.8 m) | 1,000 to 100,000 ft (305.8 m to 30.48 km) |
| Projectile Size (Mass) | 0.0001 to 100 lb (0.045 g to 45.36 kg) | 100 to 10,000,000 lb (45.36 to 4,535,924 kg) |
| Projectile Velocity | 3,000 to 30,000 ft/s (914 to 9144 m/s) | 3,000 to 50,000 ft/s (914 to 15,240 m/s) |
| Soft Catch Deceleration | >2,000 G's | <2,000 G's (down to 2 G's) |
| Soft Catch Damage to the Projectile | Significant to high | Low to none |

In one or more embodiments, the present disclosure thus can provide a launch system for launch of a vehicle. As a non-limiting example, the launch system can comprise: a preliminary accelerator tube system (PAT) including: a pre-acceleration chamber configured to receive a gas and an electric heater configured to heat the gas; a valve assembly downstream of the pre-acceleration chamber and in fluid communication therewith, the valve assembly including at least one pressure-releasable valve; and a pre-accelerator tube downstream of the valve assembly and in fluid communication therewith, the pre-accelerator tube being configured to contain the vehicle; wherein opening of the at least one pressure-releasable valve of the valve assembly creates a pressure wave sufficient to accelerate the vehicle through the pre-accelerator tube. In further embodiments, the launch system can be defined in relation to one or more of the following statements, which can be combined in any number and order.

The pre-acceleration chamber can be configured for reverse longitudinal movement relative a direction in which the vehicle is accelerated through the pre-accelerator tube.

The launch system further can comprise one or more recoil control elements associated with the pre-acceleration chamber.

The pre-acceleration chamber can be positioned atop one or more supports configured to stabilize the longitudinal movement of the pre-acceleration chamber.

The launch system of claim 1, wherein the pre-acceleration chamber can comprise at least an outer, structural support layer and an insulating layer interior to the outer, structural support layer.

The pre-acceleration chamber can comprise an internal heating system.

The pre-acceleration chamber can comprise one or more feed-through passages extending therethrough and can comprise one or more electrical contacts positioned within the feed-through passages, wherein the one or more feed-through passages can be electrically insulated and pressure sealing.

The pre-acceleration chamber can comprise an external heating system.

The valve assembly can comprise an elongated tube with an entry valve and an exit valve, wherein one or both of the entry valve and the exit valve can be a pressure-releasable valve.

One or both of the entry valve and the exit valve of the valve assembly can include a burst disk.

The valve assembly can comprise an interconnecting line and valve configured for one or both of inflow and outflow of gas from the valve assembly.

The launch system further can comprise a pre-accelerator loader positioned downstream of the valve assembly and upstream of the pre-accelerator tube, the pre-accelerator loader being configured for loading the vehicle into the PAT.

The pre-accelerator loader can comprise at least a tube segment that is translatable between a position of alignment with the valve assembly and the pre-accelerator tube and a position out of alignment with the valve assembly and the pre-accelerator tube.

The launch system further can comprise a gas stripper tube positioned downstream of the pre-accelerator tube, wherein the gas stripper is configured for withdrawal of gas therefrom.

The launch system further can comprise an exit portal including a plurality of gate valves.

The exit portal further can include a membrane unit positioned downstream from the plurality of gate valves.

The launch system further can comprise a main accelerator tube system (MAT) positioned downstream of the PAT.

The MAT can comprise a main tube that is formed at least of two concentric, conductive tubes, the main tube being configured for delivery of electrical energy to the vehicle.

In one or more embodiments, the present disclosure can provide methods for launching a vehicle. In a non-limiting example, the method can comprise: adding a pressurized gas into a pressure vessel until a preliminary pressure is achieved; heating the gas in the pressure vessel so that the gas achieves a propagation pressure that is greater than the preliminary pressure by at least a factor of 2; and adjusting a pressure in a valve assembly that comprises at least one pressure-releasable valve, the valve assembly being positioned downstream of the pressure vessel and being in fluid communication therewith via the pressure-releasable valve, wherein the adjusting of the pressure in the valve assembly is sufficient to open the at least one pressure-releasable valve; wherein the opening of the at least one pressure-releasable valve causes the gas from the pressure vessel to pass through the valve assemble and accelerate the vehicle positioned downstream from the valve assembly. In further embodiments, the method can be defined in relation to one or more of the following statements, which can be combined in any number and order.

The preliminary pressure can be at least 2 bar.

The pressurized gas can be heated in the pressure vessel to a temperature of about 500 K to about 3,000 K.

Prior to said adjusting, the pressure in the valve assembly can be less than the pressure in the pressure vessel and can be greater than a pressure where the vehicle is positioned downstream from the valve assembly.

The pressure where the vehicle is positioned downstream from the valve assembly can be less than 1 bar.

The at least one pressure-releasable valve can comprise a burst disk.

The gas passing from the pressure vessel can be sufficient to accelerate the vehicle to a velocity of at least 1,000 m/s.

The further can comprise passing the vehicle through an exit portal including a plurality of gate valves.

The exit portal further can include a membrane unit positioned downstream from the plurality of gate valves.

The method further can comprise passing the vehicle to a soft catch system comprising: a flight tube configured for longitudinal movement therethrough of the vehicle; and at least one component present within the flight tube configured to decelerate the vehicle.

The method further can comprise passing the vehicle through a main accelerator tube system (MAT) that can include a main tube that is formed at least of two concentric, conductive tubes, the main tube being configured for delivery of electrical energy to the vehicle.

In one or more embodiments, the present disclosure can relate to a soft catch system. As a non-limiting example, a soft catch system can comprise: a flight tube configured for longitudinal movement therethrough of a vehicle; and at least one component present within the flight tube configured to decelerate the vehicle. In further embodiments, the soft catch system can be defined in relation to one or more of the following statements, which can be combined in any number and order.

The at least one component present within the flight tube configured to decelerate the vehicle can comprise a plurality of sections of the flight tube filled with a plurality of gases that differ based on one or more of composition, molecular weight, temperature, and density at constant pressure.

The plurality of sections of the flight tube filled with a plurality of gases can be separated from a lower pressure section of the flight tube by a sealing membrane.

The soft catch system further can comprise a vent tube surrounding at least the plurality of sections of the flight tube filled with the plurality of gases.

The plurality of sections of the flight tube filled with the plurality of gases can include a plurality of vents.

The at least one component present within the flight tube configured to decelerate the vehicle can comprise an ablative material configured to interact with a gas bearing band present on at least a portion of the vehicle.

The ablative material can be configured as a ramp within the flight tube.

The ablative material can be positioned within at least one trough formed along a length of the flight tube.

In some embodiments, the present disclosure can relate to a method of rapidly firing a light gas accelerator by rapid introduction of a cold light gas or liquid and a pre-heated element into the breech region of the light gas accelerator.

In some embodiments, the present disclosure can relate to a method of achieving higher velocities in a light gas accelerator by externally pre-heating an element which is then rapidly introduced in the breech region of the light gas accelerator.

BRIEF DESCRIPTION OF THE FIGURES

Figure 1:
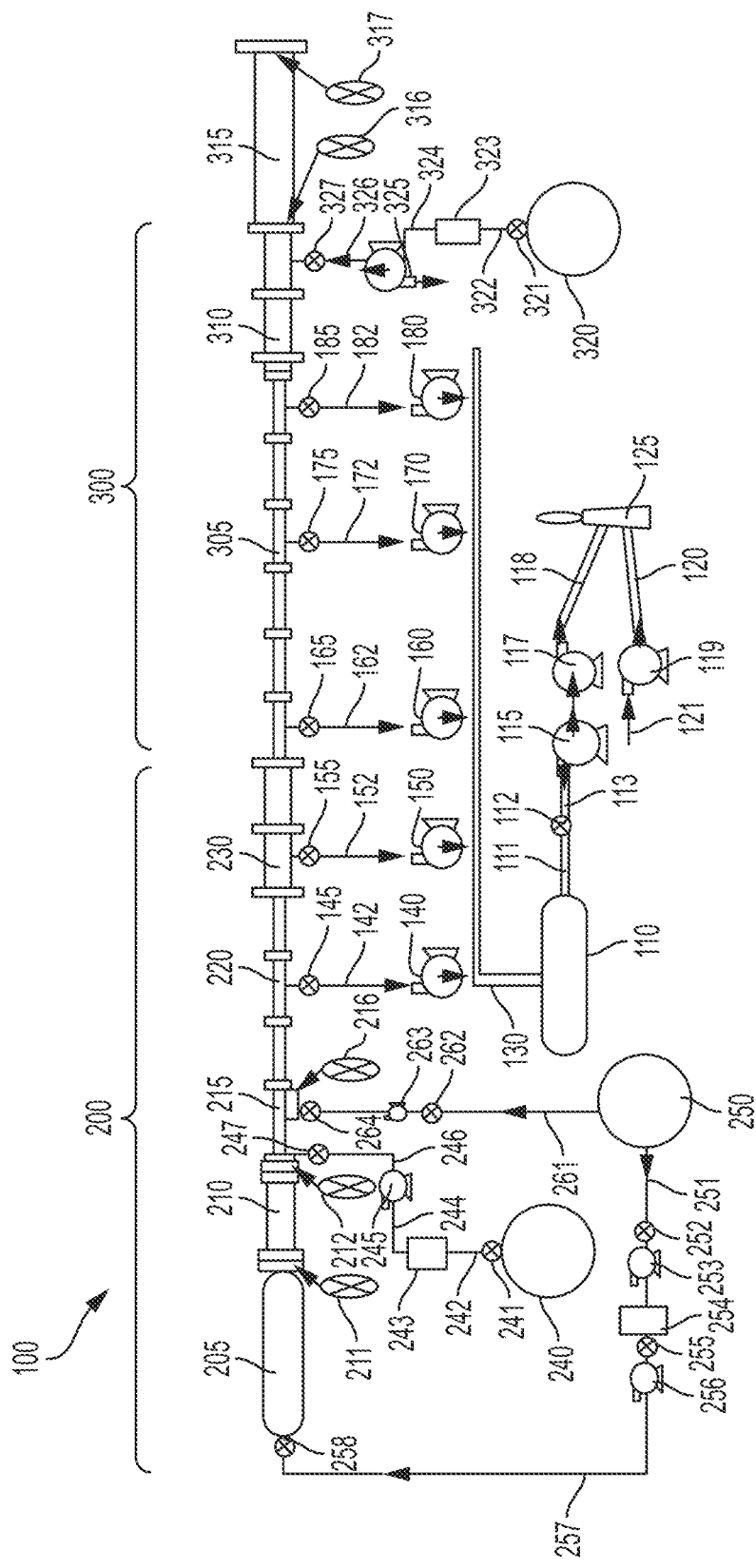
Figure 2:
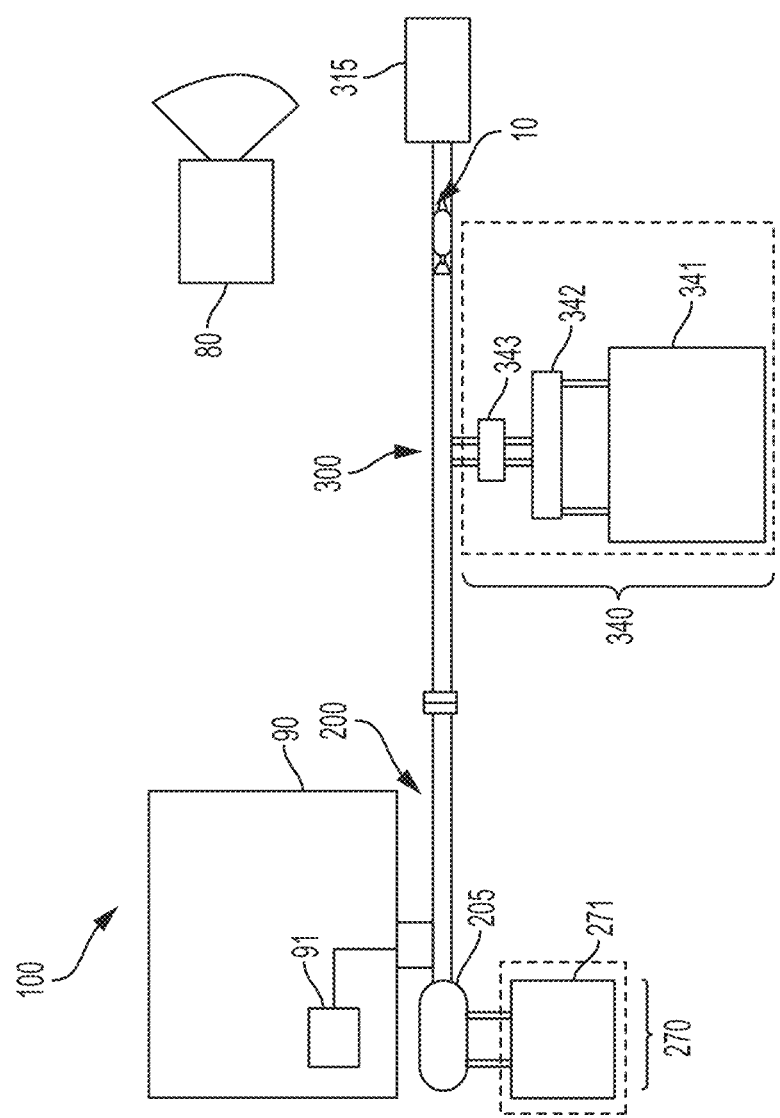
Figure 3:
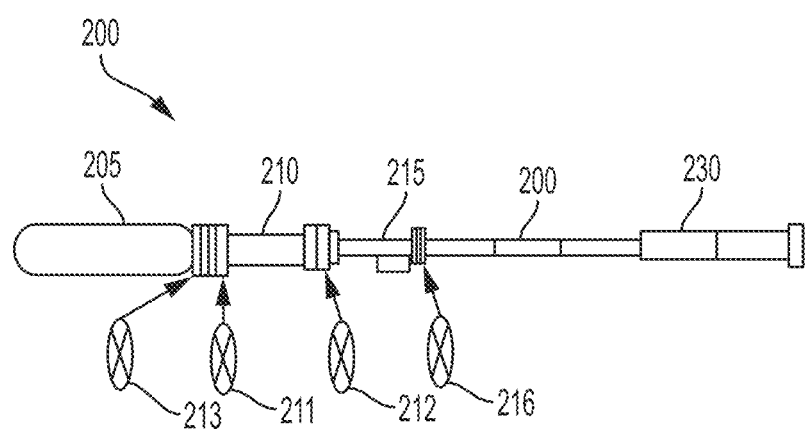
Figure 4A:
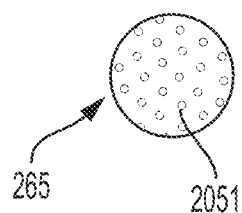
Figure 4:
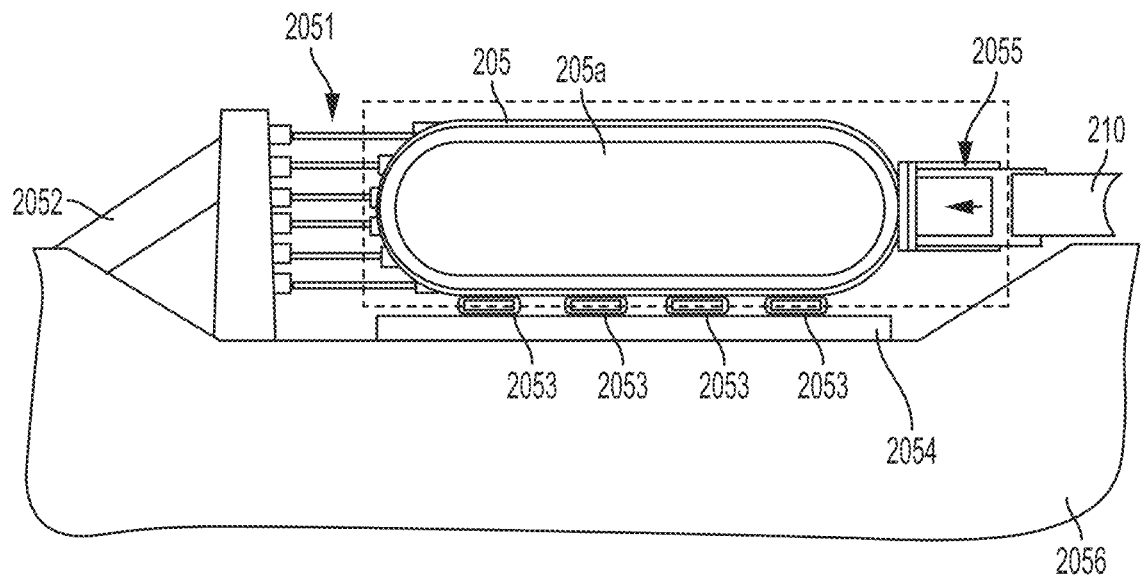
Figure 5A:
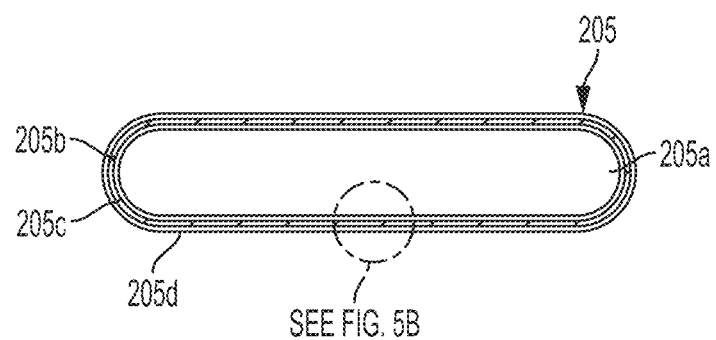
Figure 5B:
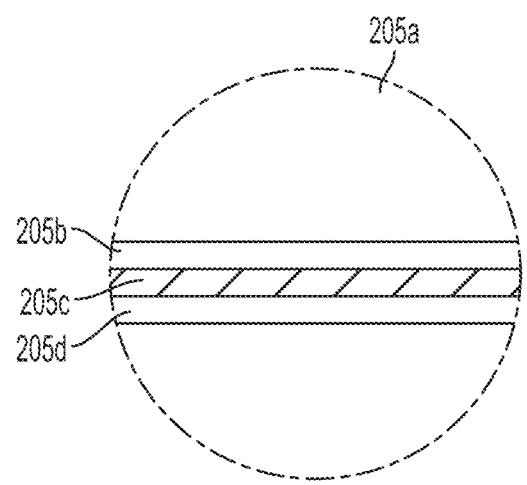
Figure 7A:
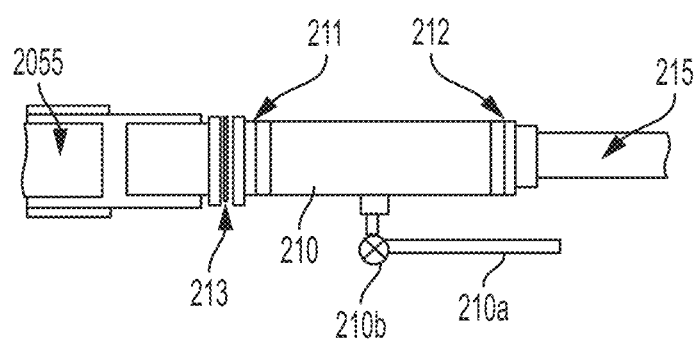
Figures 7B, 7C:
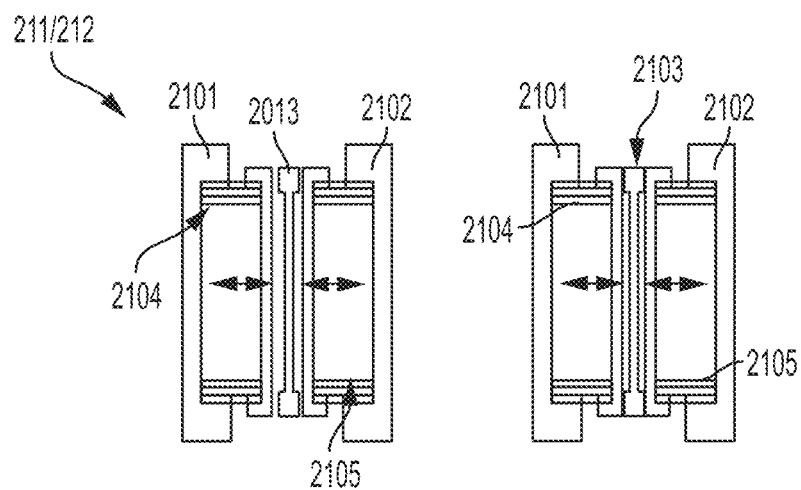
Figure 8A:
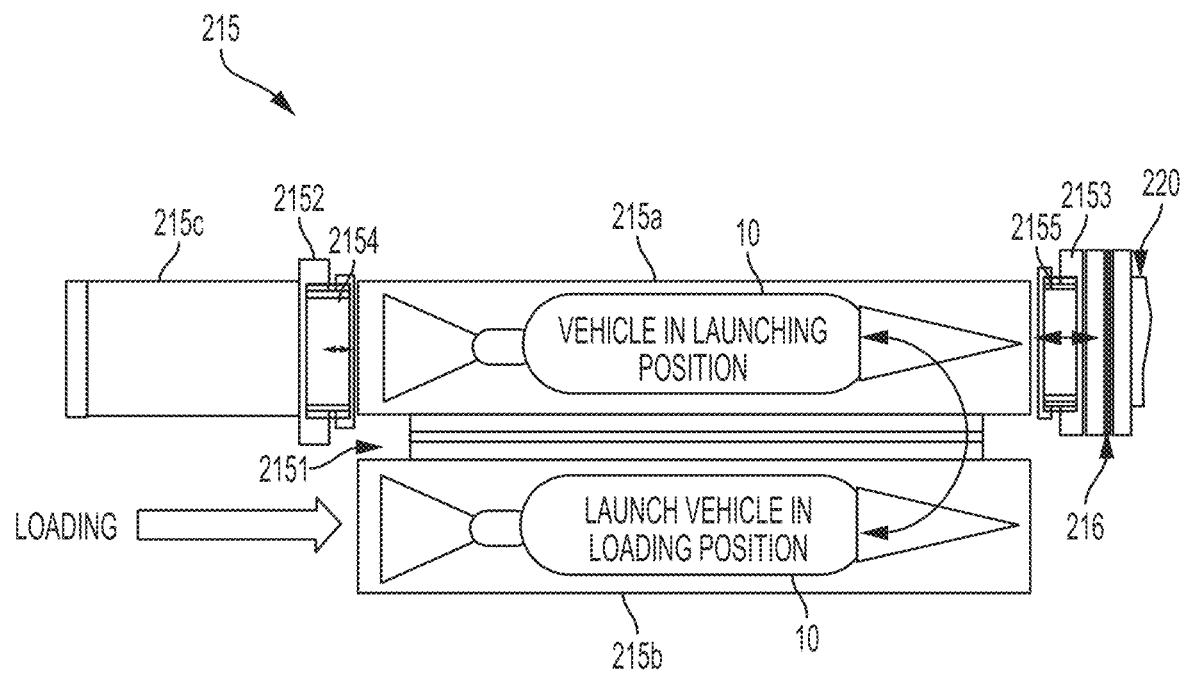
Figure 8B:
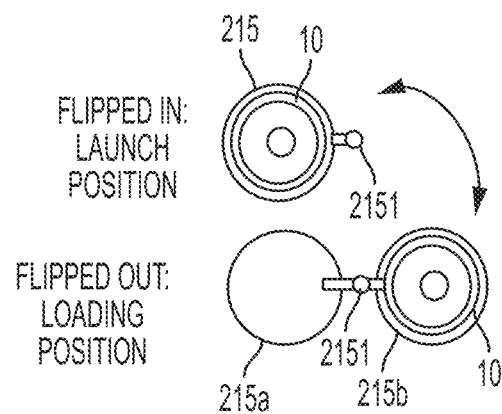
Figure 8C:
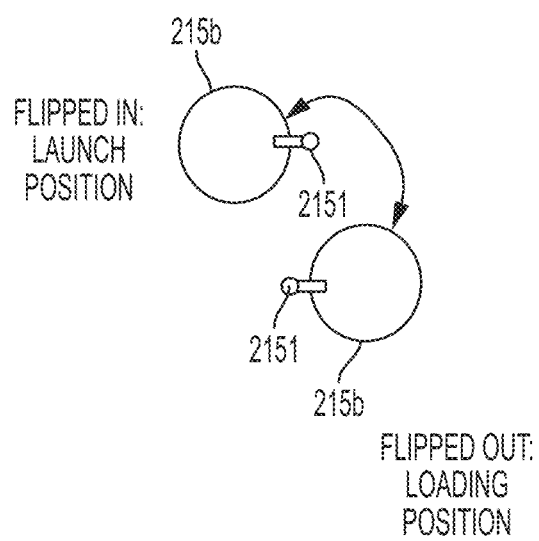
Figure 9A:
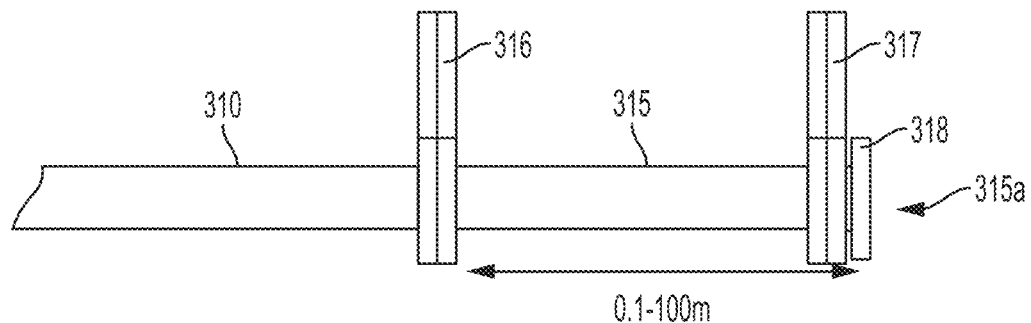
Figure 9B:
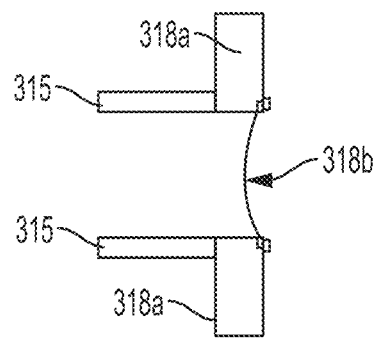
Figure 10:
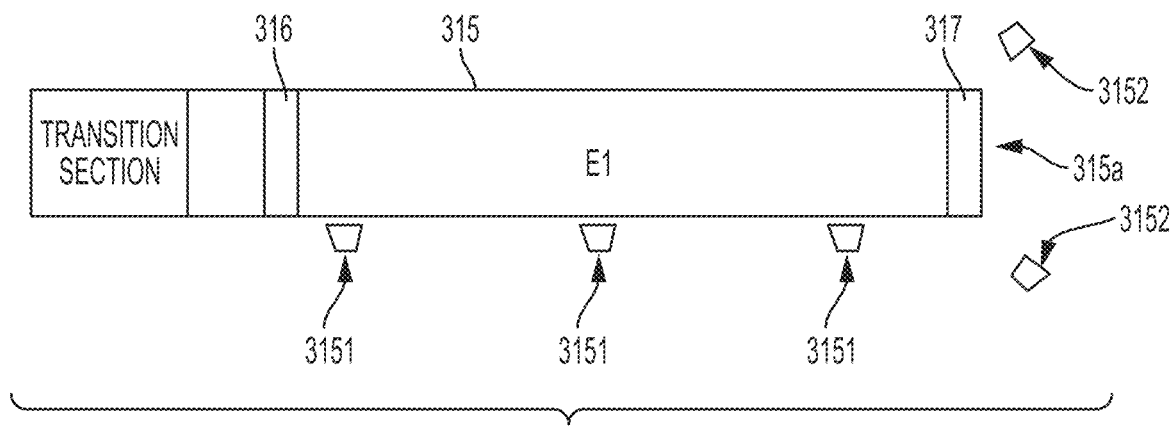
Figure 11A:
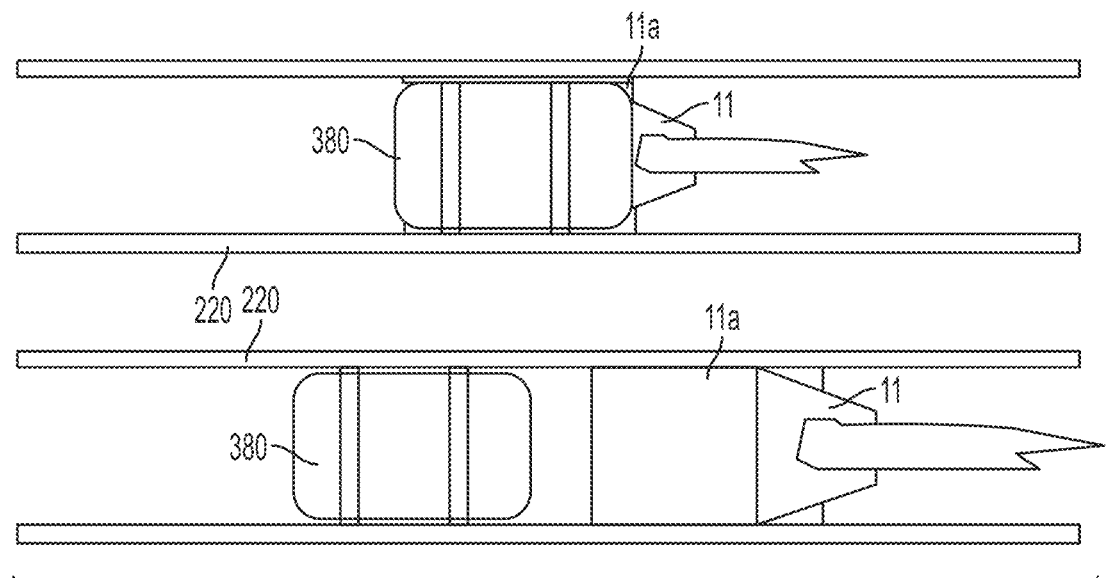
Figure 11B:
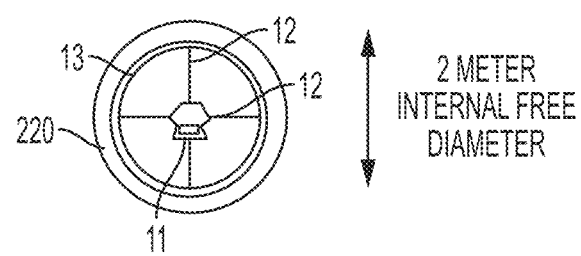
Figure 12:
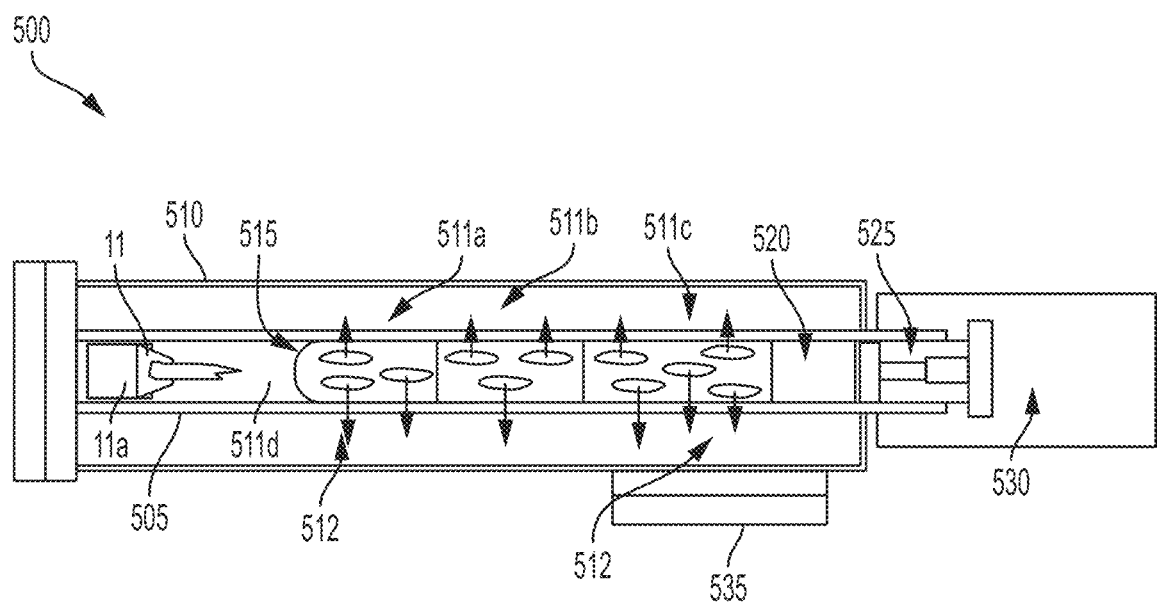
Figure 13:
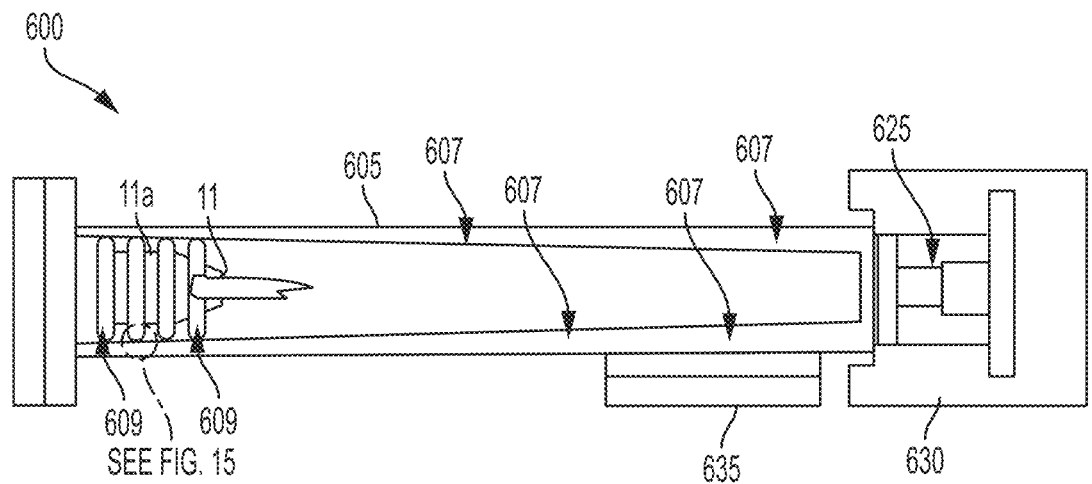
Figure 14A:
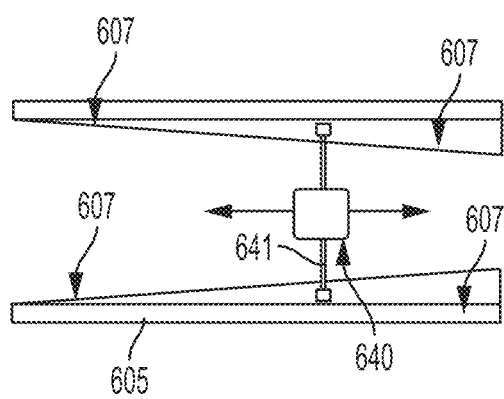
Figure 14B:
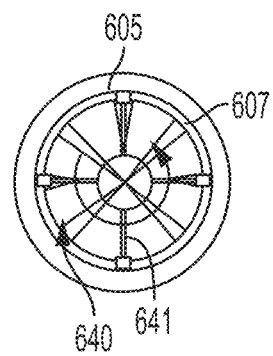
Figure 15:
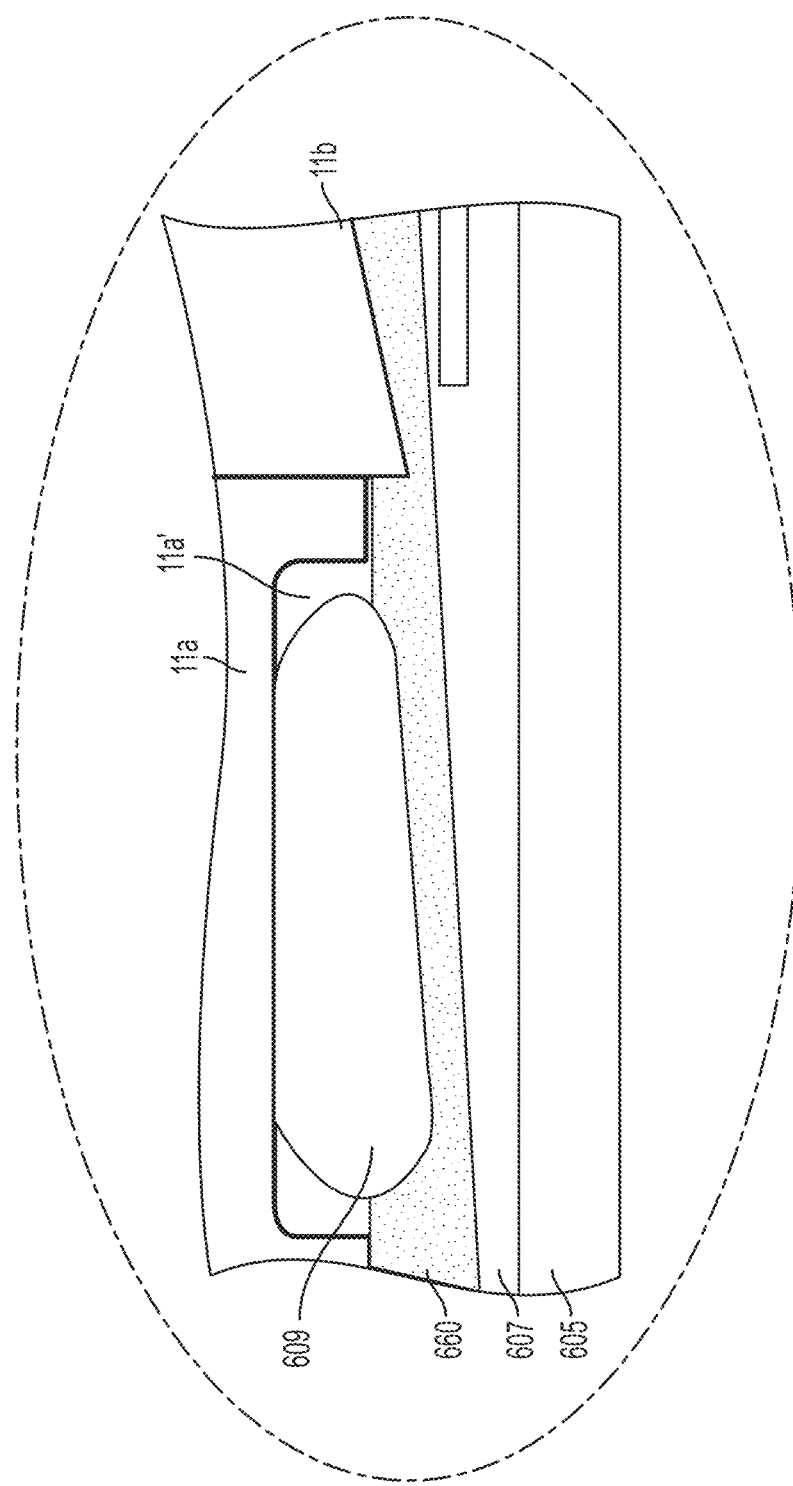
Figure 17:
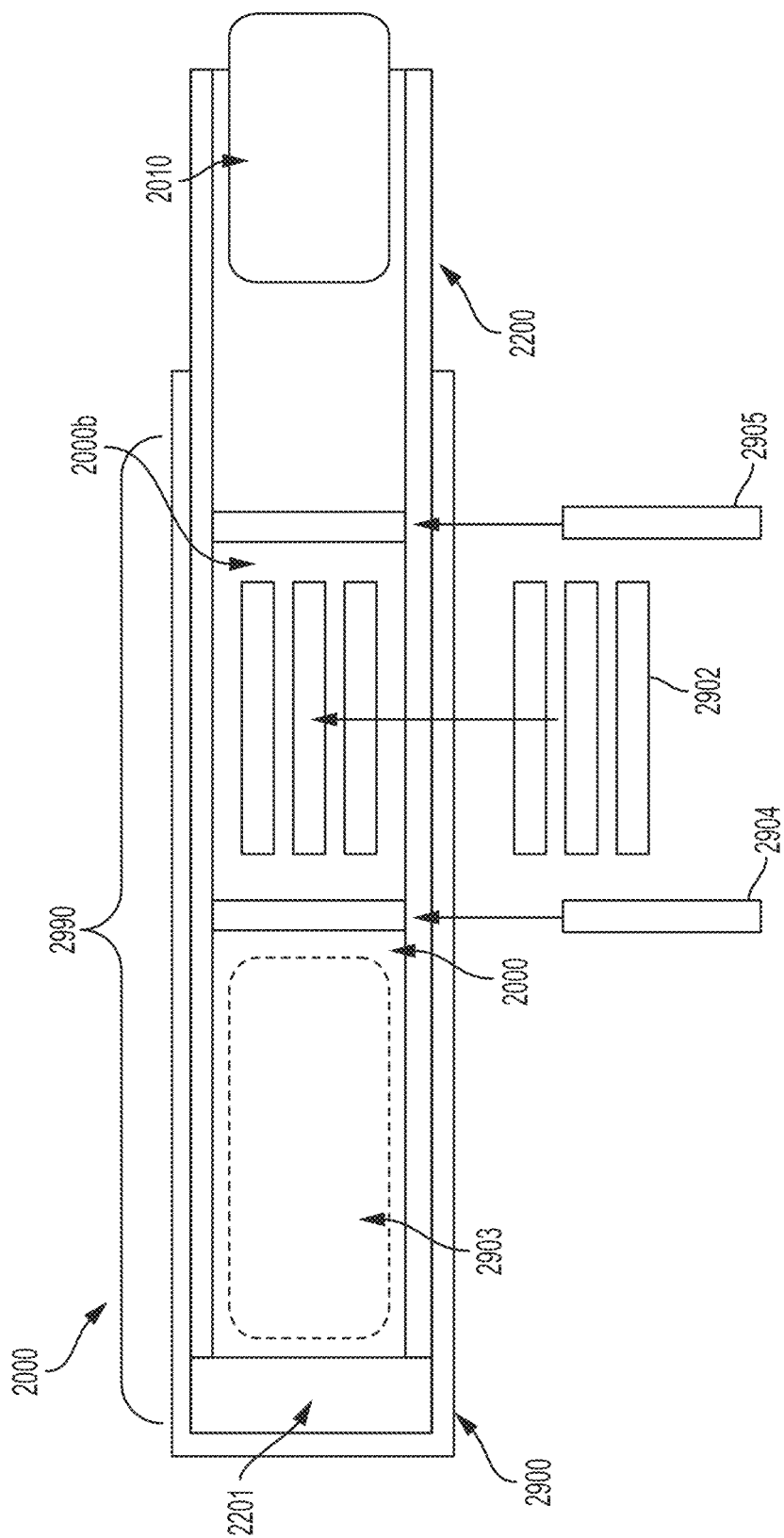

Having thus described the disclosure in the foregoing general terms, reference will now be made to the accompanying drawings, which are not necessarily drawn to scale, and wherein:

FIG. 1 is a schematic illustration of a launch system according to embodiments of the present disclosure including a Preliminary Accelerator Tube (PAT) System and a Main Accelerator Tube (MAT) System, wherein the indication of the use of hydrogen and nitrogen is exemplary and does not exclude the use of other gases, such as argon, helium, and the like;

FIG. 2 is a schematic illustration of various elements of an overall launch system according to embodiments of the present disclosure;

FIG. 3 is a schematic illustration showing an enlarged view of a PAT according to embodiments of the present disclosure;

FIG. 4 is an illustration of a pre-acceleration chamber and associated components according to embodiments of the present disclosure;

FIG. 4a is an end view of the pre-acceleration chamber of FIG. 4 showing the recoil pistons connected to the end of the pre-acceleration chamber;

FIG. 5a is a partial cross-section of a pre-acceleration chamber according to embodiments of the present disclosure, particularly showing an exemplary wall construction;

FIG. 5b is an enlarged view of a section of a wall from the pre-acceleration chamber illustrated in FIG. 5a;

FIG. 6a illustrates a top, cross-sectional view through a pre-acceleration chamber according to embodiments of the present disclosure;

FIG. 6b illustrates a vertical cross-section through the pre-acceleration chamber of FIG. 6a;

FIG. 6c is an enlarged view of a section of a wall from the pre-acceleration chamber illustrated in FIG. 6a;

FIG. 7a is a partial view of a PAT according to disclosures of the present disclosure particularly illustrating the valve section;

FIG. 7b is a cross-section through an entry valve and/or exit valve of the valve section of FIG. 7a according to embodiments of the present disclosure showing a clamp of the valve in an open position;

FIG. 7c is a cross-section through an entry valve and/or exit valve of the valve section of FIG. 7a according to embodiments of the present disclosure showing a clamp of the valve in a closed position;

FIG. 8a is a partial view of a pre-accelerator loader according to embodiments of the present disclosure;

FIG. 8b is a partial cross-section through the pre-accelerator loader according to FIG. 8a illustrating a flip-out mechanism;

FIG. 8c is a partial cross-section through the pre-accelerator loader according to FIG. 8a illustrating an alternative flip-out mechanism;

FIG. 9a is an illustration of an exit portal according to embodiments of the present disclosure;

FIG. 9b is partial cross-section of a membrane clamp at an end of the exit portal of FIG. 9a;

FIG. 10 is a further illustration of an exit portal according to embodiments of the present disclosure illustrating additional components that may be combined therewith;

FIG. 11a is a partial cross-section of a test vehicle in a launch tube according to embodiments of the present disclosure both while connected to a pusher plug and after being disconnected from the pusher plug;

FIG. 11b is a vertical cross-section through the launch tube of FIG. 11a with the test vehicle therein;

FIG. 12 is a partial cross-section of a soft catch system according to embodiments of the present disclosure;

FIG. 13 is a partial cross-section of a soft catch system according to embodiments of the present disclosure;

FIG. 14a is a partial cross-section providing a top view of a portion of a soft catch system according to embodiments of the present disclosure;

FIG. 14b is a vertical cross-section through the soft catch system of FIG. 11a;

FIG. 15 is an illustration of various components of a soft catch system according to embodiments of the present disclosure; and FIG. 16a provides a partial cross-section of a top view of a soft catch system according to embodiments of the present disclosure;

FIG. 16b shows a vertical cross-section through the soft catch system of FIG. 16a showing decelerating arms in a retracted position;

FIG. 16c shows a vertical cross-section through the soft catch system of FIG. 16a showing decelerating arms in an extended position; and FIG. 17 illustrates further embodiments of a PAT according to the present disclosure.

DETAILED DESCRIPTION OF THE DISCLOSED EMBODIMENTS

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the present disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure provides vehicle launch systems and methods. In some embodiments, the disclosure can relate to a light gas accelerator and methods of implementing a launch utilizing the light gas accelerator. According to one or more embodiments, a projectile (hereinafter referenced as a "vehicle" or "model") can be launched through a light gas accelerator (hereinafter referenced as a Preliminary Accelerator Tube unit—"PAT") and into a Main Accelerator Tube unit—"MAT". The vehicle or model may exit the MAT for atmospheric launch. In some embodiments, the PAT may be used to launch a vehicle or model into a test section and soft catch section or directly into free atmospheric flight.

A schematic illustration of a launch system 100 according to embodiments of the present disclosure including a PAT 200 and a MAT 300 is provided in FIG. 1. As seen therein, the PAT 200 includes a pre-acceleration chamber 205, a valve section (or valve assembly) 210 with an entry valve 211 and an exit valve 212, a pre-accelerator loader 215, a loader gate valve 216, a pre-accelerator tube 220, and a gas stripper 230, which are all substantially aligned. As further illustrated in FIG. 3, a pre-acceleration chamber gate valve 213 can be included between the pre-acceleration chamber 205 and the entry valve 211 into the valve section 210. In some embodiments, the entry valve 211 and the exit valve 212 can one or both be a burst disk or rapid valves. A first liquid $N_2$ supply 240 is present and provides liquid $N_2$ through a valve 241 and line 242 to a first $N_2$ vaporizer 243 so that $N_2$ gas passes from line 244 through a pump 245, pressurized line 246, and valve 247 into the pre-accelerator loader 215. The pump 245 may be configured for pumping N2 both into and out of the pre-accelerator loader. A liquid $H_2$ supply 250 is present and provides liquid $H_2$ in line 251 through valve 252 and then pump 253 before passing into $H_2$ vaporizer 254. $H_2$ gas exits the $H_2$ vaporizer 254 through a valve 255 and is pumped to an increased pressure in pump 256. The pressurized $H_2$ gas passes through line 257 and valve 258 into the pre-acceleration chamber 205, preferably proximate an upstream portion thereof. Alternately or additionally, liquid $H_2$ from the liquid $H_2$ supply 250 passes through line 261, valve 262, pump 263, and valve 264 for passage into the pre-accelerator loader 215 for filling of the fuel tank of the launch vehicle 10, such as further described herein.

The MAT 300 includes a main tube 305, a transition tube 310, and an exit portal 315 including a first gate valve 316 leading into the exit portal and a second gate valve 317 leading out of the exit portal. A second liquid $N_2$ supply 320 is present and provides liquid $N_2$ through a valve 321 and line 322 into a second $N_2$ vaporizer 323. N2 gas passes through line 324 to pump 325 from which pressurized $N_2$ gas passes through line 326 and valve 327 into the transition tube 310.

The launch system 100 as illustrated in FIG. 1 further includes a gas balance system whereby $H_2$ gas in the launch system can be removed from the system as needed. The $H_2$ gas is preferably removed from the PAT launch tube after every launch in order to re-establish a substantial vacuum inside the launch tube in order to enable another launch to occur. This $H_2$ generally cannot be safely released into the air due to creation of safety hazards such as explosions or fires. It therefore generally must be safely flared by igniting with an appropriate mixture of air to convert the $H_2$ to $H_2O$, and without generating nitric oxide pollutants. It is generally a best practice to temporarily store the $H_2$ removed from the PAT launch tube in a ballast tank so that the flare rates can be controlled independently from the $H_2$ gas removal rates. This allows the gas flare rates to be adjusted for scheduling convenience, most effective and safe operations, and to avoid nitric oxides generation. Specifically, $H_2$ can be stored in $H_2$ ballast tank 110 and passed as needed through line 111, valve 112, and line 113 into pump 115 and pump 117 before passage through line 118 into $H_2$ disposal unit 125 (e.g., an $H_2$ flare). $H_2$ from one or more sections of the PAT and/or the MAT can pass into the $H_2$ ballast tank 110 through common line 130 from any one or more of pump 140 (from line 142 and valve 145), pump 150 (from line 152 and valve 155), pump 160 (from line 162 and valve 165), pump 170 (from line 172 and valve 175), and pump 180 (from line 182 and valve 185). Valve 145 is in fluid communication with the pre-accelerator tube 220, valve 155 is in fluid communication with the gas stripper 230, valve 165 is in fluid communication with an upstream portion of the main tube 305, valve 175 is in fluid communication with an intermediate portion of the main tube 305, and valve 185 is in fluid communication with a downstream portion of the main tube 305. Oxygen 121 for use in combustion of $H_2$ can be pumped in pump 119 to line 120 for delivery to the $H_2$ disposal unit 125. The oxygen 121 thus can be compressed for mixture with the $H_2$ at appropriate rates to achieve safe and substantially pollution free combustion.

Although hydrogen and nitrogen are exemplified in relation to the launch system 100, such materials should not be construed as limiting. For example, in various embodiments, gases such as argon, helium, and the like may be used in combination with or as an alternative for either or both of the nitrogen and hydrogen.

Additional elements of the launch system 100 are illustrated in FIG. 2. The PAT 200 can include a PAT power supply 270, such as a battery bank 271. Likewise, the MAT 300 can include a MAT power supply 340. In the illustrated embodiment, a battery bank 341 can be used and can be the same as the PAT battery bank 271 or a separate battery bank. As illustrated, an energy storage inductor 342 is combined with the MAT battery bank 341 as well as explosive switch holders 343 (although alternative switch types may also be used). FIG. 2 further illustrates a launch vehicle 10 present within the MAT 300 and an operations building 90 useful for payload preparation and launch operations. A range systems unit 80 can be provided for monitoring and controlling launched vehicles and providing data for assisting in launch operations.

The presently disclosed launch systems and methods provide multiple advantages over known systems. For example, the present disclosure can particularly provide a low pressure, low G gas accelerator. For example, in one or more embodiments, the present disclosed launch systems and launch methods can be configured for operation with internal pressures of less than 10,000 PSI, less than, less than 5,000 PSI, or less than 2,000 PSI. More particularly, internal pressures can be in the range of about 10 PSI to about 10,000 PSI, about 20 PSI to about 5,000 PSI, about 50 PSI to about 2,000 PSI, about 100 PSI to about 1,000 PSI, or about 200 PSI to about 800 PSI. In one or more embodiments, gravitational forces during acceleration and/or deceleration of a launch vehicle can be less than 2,000 G's, less than 1,500 G's, or less than 1,000 G's. More particularly, gravitational forces on the launch vehicle can be about 2 G's to about 2,000 G's, about 2 G's to about 1,000 G's, about 2 G's to about 500 G's, or about 2 G's to about 200 G's. Such device has not heretofore been possible according to the prior art due to at least the following: velocity limitations at low accelerations; friction losses in very high length to diameter ratio; and inability to have a gas chamber at significantly high pressure and significantly high temperature.

The pre-acceleration chamber 205 of the PAT 200 is illustrated in greater detail in FIG. 4. A seen therein, the pre-acceleration chamber 205 includes an open interior 205a for containing the hydrogen gas. The release of the pressurized gas from the pre-acceleration chamber can cause significant recoil (i.e., longitudinal movement in the reverse direction from the direction in which the launch vehicle is to be accelerated), and the PAT 200 thus can include elements configured to control the recoil. As illustrated, a plurality of recoil pistons 2051 are attached to a rear portion of the pre-acceleration chamber 205. Inset FIG. 4a shows a partial cross-sectional view through the rear portion of the pre-acceleration chamber 205 with the recoil pistons 2051 therein. The recoil pistons 2051 attach at a first end to the pre-acceleration chamber 205 and at a second, opposing end to a recoil backstop 2052, which can be formed of typical construction materials (e.g., steel and/or concrete). The pre-acceleration chamber 205 can rest atop one or more supports 2053 or similar elements configured to stabilize the longitudinal movement of the pre-acceleration chamber during recoil. Exemplary supports include any variety or combination of bushings, rails and trolleys, rocking supports, and elastomeric elements. The supports 2053 can be provided on a stable base 2054 (e.g., a concrete slab), which itself can be positioned directly on the ground 2056 or other intermediate support element. A sliding seal 2055 is positioned immediately downstream of the pre-acceleration chamber 205 and upstream of the pre-acceleration chamber gate valve 213. In alternative embodiments, the recoil pistons 2051 may be replaced (or supplemented) with an elastomeric recoil pad.

The pre-acceleration chamber 205 can be formed of any construction suitable for containing high pressure gas. In the embodiment illustrated in FIG. 5a and FIG. 5b, the pre-acceleration chamber 205 has a three layer construction—an inner layer 205b, a middle layer 205c, and an outer layer 205d. The three layer construction is particularly effective to contain the hot pressurized $H_2$ in the open interior 205a of the pre-acceleration chamber 205. In preferred embodiments, the inner layer 205b can be formed of stainless steel (e.g., 316ss), and the outer layer 205d can likewise be formed of steel. The outer layer 205d preferably is formed of a material suitable to provide the structural strength of a pressure vessel and capable of containing materials under pressures as described herein. Thus, the outer layer 205d can be characterized as a structural support layer. The middle layer 205c separating the two steel tank walls can be an insulator, such as molded alumina, zirconia, and other high temperature and fracture and high velocity gas flow erosion resistant insulators known in the art. The insulators forming the middle layer 205c can be porous and spaced so that pressurized $H_2$ is not trapped beneath them upon launch initiation by activation of the burst disks. The pressurized $H_2$ in the open interior 205a of the pre-acceleration chamber 205 can be burst heated by a main battery bank to approximately 1500K. Launch is then initiated, and hot $H_2$ is released before significant heating of the outer wall 205d of the pre-acceleration chamber 205 occurs.

In some embodiments, the pre-acceleration chamber 205 can include an internal heating system for heating of the $H_2$ therein. For example, as illustrated in FIG. 6a through FIG. 6c, the pre-acceleration chamber 205 can include at least one heater wire 205g positioned within the open interior 205a. As illustrated, the heater wire 205g comprises a helically coiled tungsten wire; however, other conductive wire may also be used. The pre-acceleration chamber 205 can be formed with a plurality of feed-through passages 205e extending through the outer layer 205d and through which electrical contacts 205h extend. The electrical contacts 205h connect to a bus bar 205f positioned adjacent or within the middle layer 205c of the pre-acceleration chamber 205 for making electrical contact with the heater wire 205g. Electrical energy from the PAT battery bank 271 thus passes via the electrical contacts 205h to the bus bar 205f and to the heating wire 205g for electrical heating of the $H_2$ within the open space 205a of the pre-acceleration chamber 205 for expansion and further pressurization. In such embodiments, the $H_2$ can be heated to very high temperatures while the outer chamber wall remains at or near room temperature. This allows low cost steel to be used to form the outer wall of the pre-acceleration chamber 205 instead of high temperature resistance metal alloys, which can cost significantly more. On the other hand, such embodiments can require the use of internal heaters that are resistant to high temperatures, that are exposed to $H_2$, that are subjected to rapid repeated temperature cycling, and that are exposed to high velocity shear flows of $H_2$ during the launch process. Such matters also can apply to the insulating material used to form the middle layer 205c of the pre-acceleration chamber. Moreover, the feed-through passages 205e must be electrically insulated and pressure sealing.

In one or more embodiments, the pre-acceleration chamber 205 can utilize an external heater system and thus forego the need for the internal heater and optionally the insulating layer 205c. A suitable external heater would be any system configured to heat the entire pre-acceleration chamber 205 to the necessary operating temperature. To avoid temperature cycling and excess energy consumption, the pre-acceleration chamber 205 may be continuously maintained at the desired operating temperature except for occasional cool down periods for maintenance or when long periods occur between launches. The heat up and cool down times for the pre-acceleration chamber 205 can be substantially long (e.g., up to several hours or even several days) to avoid internal stresses due to the differential thermal expansion.

The $H_2$ can be heated in the pre-acceleration chamber to a temperature in the range of about 300K to about 3,000K. Heating temperature can influence the preferred type of heating (internal versus external) and can depend upon desired launch velocity. These factors are evident in TABLE 2. In some embodiments, external heating can be preferred for space launch (for example, where a velocity of 1250 m/s can be sufficient for application with combined additional boost), short range suborbital launch (for example, where 1250 m/s is sufficient for application without additional boost), and long range suborbital launch (for example, where 1250 m/s is sufficient for application with combined additional boost). In other embodiments, internal heating can be preferred for intermediate range suborbital launch (for example, where 2020 m/s provides the intermediate range without additional boost).

TABLE 2

| Hydrogen Temperature (K) | Approximate Hydrogen Sound Speed (m/s) | Approximate Maximum Practical High G Velocity (m/s) | Approximate Maximum Practical Low G Velocity (m/s) |
| --- | --- | --- | --- |
| 300 | 1285 | 1930 | 850 |
| 350 | 1390 | 2090 | 920 |
| 400 | 1480 | 2220 | 980 |
| 450 | 1570 | 2360 | 1040 |
| 500 | 1660 | 2490 | 1100 |
| 550 | 1740 | 2610 | 1150 |
| 600 | 1820 | 2730 | 1200 |
| 650 | 1890 | 2840 | 1250 |
| 700 | 1960 | 2940 | 1290 |
| 750 | 2030 | 3050 | 1340 |
| 800 | 2100 | 3150 | 1390 |
| 850 | 2160 | 3240 | 1430 |
| 900 | 2230 | 3350 | 1470 |
| 1000 | 2350 | 3530 | 1550 |
| 1100 | 2460 | 3690 | 1620 |
| 1200 | 2570 | 3860 | 1700 |
| 1300 | 2670 | 4010 | 1760 |
| 1400 | 2780 | 4170 | 1830 |
| 1500 | 2870 | 4310 | 1890 |
| 1600 | 2970 | 4460 | 1960 |
| 1700 | 3060 | 4590 | 2020 |
| 1800 | 3150 | 4730 | 2080 |
| 2000 | 3320 | 4980 | 2190 |
| 2200 | 3480 | 5220 | 2300 |

TABLE 2-continued

| Hydrogen Temperature (K) | Approximate Hydrogen Sound Speed (m/s) | Approximate Maximum Practical High G Velocity (m/s) | Approximate Maximum Practical Low G Velocity (m/s) |
| --- | --- | --- | --- |
| 2400 | 3630 | 5450 | 2400 |
| 2600 | 3780 | 5670 | 2490 |
| 2800 | 3930 | 5900 | 2590 |

The presently disclosed systems and methods beneficially are not hindered by what were previously believed to be limitations in the prior art, such as the need to utilize a significantly high pressure and significantly high temperature gas chamber. For example, the present disclosure can be characterized in relation to any one or more of the following.

In some embodiments, the present disclosure utilizes a significantly large chamber while keeping the pressure low and keeping the chamber at a relatively low temperature. For example, the pressure vessel forming the pre-acceleration chamber can have an internal volume in preferred embodiments of approximately 35,000 ft$^3$. In exemplary embodiments, the internal volume of the pressure-vessel forming the pre-acceleration chamber can be up to about 10,000 ft$^3$, up to about 25,000 ft$^3$, or up to about 50,000 ft$^3$, such as about 20 ft$^3$ to about 50,000 ft$^3$, about 50 ft$^3$ to about 45,000 ft$^3$, about 100 ft$^3$ to about 40,000 ft$^3$, or about 1,000 ft$^3$ to about 35,000 ft$^3$. To this end, the pressure vessel can have a diameter of about 10 ft to about 200 ft, about 20 ft to about 150 ft, or about 40 ft to about 100 ft, and the pressure vessel can have a length of about 100 ft to about 5,000 ft, about 500 ft to about 4,500 ft, or about 1,000 ft. to about 4,000 ft.

Scaling to significantly large diameters has been believed to be impossible because of the inability to produce thick walled, large tubes. According to the present disclosure, thick walls are not required because the low G forces achieved according to the presently disclosed systems and methods only require correspondingly low chamber pressures. As a non-limiting example, a pre-acceleration chamber having a diameter of 80" can have an internal pressure of 360 PSI to produce a 200 G acceleration on a 9000 lb projectile. A relatively low cost steel can exhibit sufficient strength to withstand a maximum pressure of 10,000 PSI, and a safety factor of 4 would give a usable steel strength of 2,500 PSI. Under such exemplary conditions, the walls of the pre-acceleration chamber would then need to be approximately 6 in thick. This is a reasonable fabrication thickness that can be achieved. In a conventional gas gun with 10,000 G's acceleration, the driving pressure would need to be 18,000 PSI, and the resulting wall thickness would be approximately 300 inches. Due to this extreme thickness, additional multiplicative factors must be included in the pressure vessel design so that the actual required thickness would approach 600 inches. Accordingly, the presently disclosed systems and methods provide for a simpler fabrication requirements in order to achieve useful and effective launch systems and methods compared to known devices.

The operating pressures for the pressure vessel can be as otherwise described herein for the launch system. The heating temperatures for the pressure vessel can vary depending upon the type of heating utilized. For an internally heated pressure vessel (i.e., the pre-acceleration chamber), the operating temperature can be in the range of about 300 K or near ambient air temperatures, particularly where the chamber is insulated and remains relatively cool. External water cooling, if necessary, can be utilized to remove heat. For an externally heated chamber, temperatures up to about 700 K can be preferred since low cost steel can be utilized. It is important to note that the present systems and methods are suitable for operation at higher chamber temperatures, such as up to 1000 K, up to 1,500 K, or at any temperature otherwise disclosed in TABLE 2. At higher temperatures, however, the costs can become prohibitive as higher temperature resistant metals must be used to form the pressure vessel, particularly for larger sized vessels.

In some embodiments, the inside of the pre-acceleration chamber is insulated in order to minimize hot gas heating of the chamber. This can be beneficial to reduce operating temperatures as noted above and otherwise improve operation of the disclosed systems and methods.

In some embodiments, pulsed electrical heating is used to heat gas rapidly then discharge before heat travels through the insulation. Preferably, an electrical pulse is relatively long so as to minimize power supply costs; however, the electrical pulses utilized in the present systems and methods are typically significantly shorter than the thermal conduction time constant of the chamber's internal insulation. For example, in internally heated embodiments, an electrical pulse can have a duration of about 100 s to about 3,000 s, about 200 s to about 2,500 s, or about 500 s to about 2,000 s. In preferred embodiments, the power of the electrical pulses can be on the order of multiple megawatts (MW). For example, pulsed power can be up to 1,000 MW, up to 2,000 MW, or up to 5,000 MW, such as about 10 MW to about 5,000 MW, about 20 MW to about 4,000 MW, or about 50 MW to about 2,000 MW. The voltages and currents of the pulses can depend on heater designs, but typical voltages would be in the range of about 100V to about 5,000 V, about 250V to about 3,000V, or about 480V to about 2,000V. Electrical currents can then be as necessary to achieve the desired power and heating rate levels to achieve the desired pulsed heating times.

Beneficially, a low cost battery power supply can be utilized to provide energy and power for large scale rapid heating. The battery configuration need only be as necessary to achieve the power requirements otherwise described herein.

The use of a layering technique as described herein—e.g., the outer housing of the pressure vessel with an internal insulator and an electrical heating layer internal thereto—can be beneficial to allow for lower operating temperatures as otherwise described herein.

As discussed herein, the use of electrical heating via electric feed-throughs is utilized in embodiments of the present disclosure to decouple thermal and mechanical design constraints. In known systems, chemical combustion heaters in the inner layer cannot decouple in this way, and chemical combustion heaters on the outer pressure shell defeat the purpose of keeping it cool. This is further beneficial in that the present disclosure can utilize low resistance feed-throughs that pass through the chamber wall and through the insulation. Moreover, bus bars can be utilized inside of the pre-acceleration chamber to distribute electrical current efficiently since they are protected by insulation. In some embodiments, the metal forming the pressure chamber itself can be used to distribute current—e.g., as opposed to utilizing a separate bus bar. In some embodiments where the pressure vessel inner wall is used to distribute electrical current, the metal chamber wall may be segmented, and one or more insulating layers may be present between segments. In some embodiments, high resistance may be used only in the inner electrical heating layer. In preferred embodiments, heaters for use with the pre-acceleration chamber can be hydrogen resistant, very high temperature heaters such as tungsten, carbon, or similar materials. More particularly, carbon coated, very high temp materials such as hafnium boride may be utilized.

In one or more embodiments, the pre-acceleration chamber may be heated using beamed energy heaters, such as lasers or microwaves. This can be beneficial to heat the chamber gas directly without the requirement of internal electrodes that must withstand the high temperature hydrogen and high velocity gas flow rates, as well as the continual temperature cycling. Short wavelength UV lasers and resonant microwave frequencies can be used where the hydrogen is absorbing the radiated energy. Alternatively, a small mass fraction of carbon or other nanosphere can be utilized to provide increased absorptivity in the hydrogen. This can be beneficial to allow for the use of a broader range of laser and/or microwave frequencies or such heating.

In some embodiments, the present methods and systems can be configured to heat hydrogen gas to yield atomic hydrogen. This can be beneficial since atomic hydrogen provides a twofold reduction in gas molecular weight and thus a square root of two increase in sound speed and potential launcher speed. Where atomic hydrogen is formed, it can be beneficial to configure operation within the pre-acceleration chamber to atomic hydrogen away from the pressure vessel surfaces. For example, in some embodiments, this can be achieved by swirling an outer hydrogen layer, which will cause the monatomic hydrogen ($H_1$) to "float" toward the center portion of the pressure vessel. By swirling the gas rapidly, the centrifugal effect will separate the lighter H atoms to the center, and the heavier $H_2$ moleculars will separate to the outer walls. This outer layer of $H_2$ can be effective to shield the inner surfaces of the system elements and keep H atoms from interacting with chamber walls, which interactions can cause the atoms to recombine rapidly back into molecular hydrogen.

In one or more embodiments, it can be useful to inject extra $H_2$ via transpiration, convective, and/or film cooling at the entry to the launch tube to produce a "smeared" film of shield cooling gas down at least a portion of the length of the launch tube. The launch vehicle and its gas bearing (as described further herein) can be effective to entrain and drag this so-formed shield gas down the launch tube to help prevent ablation and erosion of the chamber exit and launch tube entry sections.

In some embodiments, the hydrogen gas can be heated so as to yield hydrogen in a plasma form. For example, this can be achieved via heating with microwaves as noted above. In addition, a varying magnetic field can be used to heat the plasma via inductive heating and to cause it to rotate rapidly via inductive eddy current interactions. The plasma hydrogen can be substantially prevented from contacting the inner walls of the pre-acceleration chamber, such as by swirling an outer hydrogen layer. Similar to the discussion above, such swirling can be effective to cause the plasma material (i.e., H+ and e-) to effectively "float" to the center portion of the pressure vessel. The hotter plasma will be less dense and have a lower effective molecular weight than hydrogen atoms and molecular hydrogen. The chamber will thus be stratified by centrifugal forces into an innermost zone of plasma, an intermediate zone of hydrogen atoms, and an outer zone of molecular hydrogen.

In one or more embodiments, the pressure chamber can be mounted on rolling cars on rails to enable a significantly large chamber to recoil against recoil damping pistons as otherwise described above. Like methods to allow longitudinal movement of the pressure chamber while preferably limiting or preventing vertical or lateral movement can also be utilized.

The valve section 210 of the PAT 200 (positioned downstream of the pre-acceleration chamber 205) is shown in greater detail in FIG. 7a through FIG. 7c and can be otherwise referenced as being a valve assembly. In particular, the valve section 210 is substantially an elongated tube (e.g., formed of stainless steel or the like) with entry valve 211 and exit valve 212 (or similar elements) positioned at opposing ends thereof. As seen in FIG. 7a, the valve section 210 can include a vent/fill line 210a and an intervening flow valve 210b to control inflow and/or outflow of gas from the valve section 210. For example, vent-fill line 210a may interconnect with line 246 or valve 247 so that N2 may be pumped into or out of the valve section 210 using pump 245.

Embodiments of the entry valve 211 and exit valve 212 are shown in greater detail in FIG. 7b and FIG. 7c. Specifically, each valve can comprise a front plate 2101 and a rear plate 2102 that are slidingly engaged by a front clamping ring 2104 and a rear clamping ring 2105, respectively. A burst disk 2103 is positioned between the front clamping ring 2104 and the rear clamping ring 2105, as seen in the loading stage shown in FIG. 7b. The front clamping ring 2104 and the rear clamping ring 2105 are then translocated to engage the burst disk 2103 to be in a launch ready stage, as shown in FIG. 7c. The front clamping ring 2104 and the rear clamping ring 2105 can be hydraulically actuated for quick burst disk replacement. The use of the burst disks represents one embodiment for providing a pressure-releasable valve. Any type of valve that will open or otherwise release can be used so that the valve will be opened or releases upon a sufficient pressure change (e.g., a rapid decrease or rapid increase in pressure on one side of the valve). It is understood that in all cases where hydraulic clamps are mentioned, other mechanisms such as pneumatic clamps, electromagnetic clamps, or the like may be used.

The pre-accelerator loader 215 (positioned downstream of the valve section 210) can be configured for loading of the launch vehicle 10 into the PAT 200. As illustrated in FIG. 8a and FIG. 8b, the pre-accelerator loader 215 can have a hinged configuration so that the pre-accelerator loader can be rotated from an "out" or loading position to an "in" or launch position. The pre-accelerator loader 215 thus can comprise a stationary section 215a and a movable section 215b, the two sections being rotatably attached one relative to the other by a flip out hinge 2151 or any further suitable hinging mechanism. The moveable section 215b can be characterized as a tube segment. The pre-accelerator loader 215 can further include upstream and downstream clamping devices for sealingly engaging the stationary section 215a and the movable section 215b in the launch position. As shown in FIG. 8a, an upstream plate 2152 can be moveably engaged by an upstream clamping ring 2154, and a downstream plate 2153 can be moveably engaged by a downstream clamping ring 2155. The respective clamping rings can be moved away from the stationary section 215a and the moveable section 215b of the pre-accelerator loader 215 to allow the moveable section to be flipped out for loading of a launch vehicle 10. After the launch vehicle 10 has been loaded, and the moveable section 215b has been flipped back into the launch position, the respective clamping rings can be moved toward the stationary section 215a and the moveable section 215b to sealingly engage the noted sections for pre-acceleration thereof through the PAT. As illustrated in FIG. 8a, loading of the launch vehicle 10 occurs from a rear end of the moveable section 215b; however, it is understood that loading may occur from the front end if desired.

The launch vehicle 10 can be filled and cooled with liquid $H_2$ prior to being moved into the pre-accelerator loader 215, such as while positioned on a loading tray. A hydraulic ram can be used to bias the launch vehicle 10 from the loading tray in the flipped out pre-accelerator loader. In the embodiments shown in FIG. 8b, the hydraulic ram biases the launch vehicle 10 into the moveable section 215b of the pre-accelerator loader. In a further embodiment show in FIG. 8c, the stationary section 215a is absent, and the moveable section 215b (i.e., a tube segment) alone is moveably attached to the flip out hinge 2151. As such, it is evident that the pre-accelerator loader 215 can comprise at least a tube segment that is translatable between a position of alignment with the valve assembly 210 and the pre-accelerator tube 220 and a position out of alignment with the valve assembly and the pre-accelerator tube.

In operation, liquid $H_2$ from the liquid $H_2$ supply 250 is vaporized in the $H_2$ vaporizer 254 and then pumped via pump 256 into the pre-acceleration chamber 205. The $H_2$ is added to the pressure vessel forming the pre-acceleration chamber 205 until a preliminary pressure is achieved. Once the preliminary pressure in the pre-acceleration chamber 205 reaches the desired level (e.g., at least 2 bar, at least 3 bar, at least 4 bar, at least 5 bar, or at least 6 bar, preferably with a maximum limit of about 10 bar, about 15 bar, or about 20 bar, inclusive of all intermediate ranges—e.g., about 2 bar to about 20 bar, about 2 bar to about 15 bar, or about 2 bar to about 10 bar), the hydrogen is pulse heated over a time of about 5 seconds to about 60 seconds, about 10 seconds to about 45 seconds, or 15 seconds to about 30 seconds to the desired temperature range. The $H_2$ gas can enter the pre-acceleration chamber 205 at a temperature of about 225K to about 500K, about 250K to about 400K, or about 275K to about 350K. Within the pre-acceleration chamber, the $H_2$ gas is preferably heated to a temperature up to about 5000K, up to about 4000K, or up to about 3000K, preferably within a range of about 500K to about 3000K, about 750K to about 2500K, or about 1000K to about 2000K. During heating, the $H_2$ increases in pressure by at least a factor of 2, by at least a factor of 3, by at least a factor of 4, or by at least a factor of 5, preferably up to a pressure of about 20 bar to about 80 bar, about 20 bar to about 60 bar, or about 25 bar to about 40 bar. This pressure can be referred to as a propagation pressure as it is the pressure of the gas within the pressure vessel forming the pre-acceleration chamber 205 that will propagate through the PAT for acceleration of the launch vehicle 10.

The relative pressures in the pre-acceleration chamber 205, the valve section 210, and the pre-accelerator loader 215 can vary. When the pre-acceleration chamber 205 is being raised during addition and heating of the $H_2$, the pressure in the valve section 210 can be in the range of about 2 bar to about 50 bar, about 5 bar to about 30 bar, or about 10 bar to about 20 bar. At the same time, the pressure in the pre-accelerator loader 215 can be less than 2 bar, less than 1 bar, or less than 0.1 bar. Preferably, the pressure in the pre-accelerator loader during heating of the pre-acceleration chamber 205 is substantially zero (e.g., about 0.001 bar), such as being under a vacuum. In an exemplary embodiment, when the pressure in the pre-acceleration chamber is about 30 bar, the pressure in the valve section 210 can be about 15 bar, and the pressure in the pre-accelerator loader 215 can be about 0.001 bar.

Launch initiation thus is controlled by the heating of the $H_2$ within the pre-acceleration chamber 205, the associated pressure increase within the pre-acceleration chamber 205, and a subsequent rapid decrease of the pressure within the valve section 210. Referencing FIG. 7a, for example, flow valve 210b can be opened for the fill gas present in the valve section 210 to be withdrawn through vent/fill line 210a. The pressure within the valve section 210 can be rapidly reduced to, for example, about 1 bar, which causes the burst disk 2103 in entry valve 211 to rupture. The rupturing of the burst disk 2103 in entry valve 211 causes a pressure wave as the high pressure gas rapidly exits the pre-acceleration chamber 205. The pressure wave propagates through the valve section 210 and impinges upon the burst disk 2103 present in the exit valve 212 causing it to burst. The pressure wave then expands into the pre-accelerator launcher contacting the launch vehicle 10 causing it to rapidly accelerate from rest to a first stage velocity of at least 1000 m/s, at least 1500 m/s, or at least 1800 m/s, such as in the range of about 1200 m/s to about 3500 m/s, about 1500 m/s to about 3000 m/s, or about 1800 m/s to about 2500 m/s. The thusly accelerated launch vehicle 10 passes through the pre-accelerator tube 220 while achieving the maximum first stage velocity noted above and then enters the gas stripper 230, which is substantially a tube and can be formed of the same construction and materials as the pre-accelerator tube 220. During passage through the gas stripper, $H_2$ gas from the pre-acceleration chamber pressure wave is withdrawn through valve 155 and line 152 using pump 150. The gas striper 230 is effective to prevent back pressure from the PAT from decreasing the performance of the rocket motor in the MAT 300. The gas stripper 230 is also effective to prevent interference in aerodynamic testing, such as when the PAT 200 is utilized for injecting a vehicle or model into a flight tube for hypersonic testing.

The launch vehicle 10 exiting the gas stripper 230 then moves into the MAT 300. During passage through the main tube 305, the launch vehicle 10 is further accelerated as previously described in U.S. Pat. No. 9,463,881 and U.S. Pat. No. 9,617,016, the disclosures of which are incorporated herein by reference. Briefly, the main tube 305 can comprise two electrically conductive tubes and two insulator tubes. The tubes can be concentric and co-linear and can comprise, in succession, an inner insulator tube, an inner electrically conductive tube, an outer insulator tube, and an outer electrically conductive tube. The walls of the outer and inner conductive tubes can have one or more slotted tracks of varying geometries that are adapted for receiving one or more sliding contacts. The slotted track provides for an electrical connection of the outer conductive tube and an outer sliding contact. An inner sliding contact is in electrical connection with the inner conductive tube. Aligning arms can be in physical contact with the sliding contacts, and also be in physical contact with the electrical heater of the launch vehicle. In particular embodiments, the sliding contact pads may be configured to function as plasma brushes. The MAT 300 utilizes electrical heating for propulsion of the launch vehicle through the main tube 305. Specifically, gas from a propellant tank can be delivered to an electric combustion Chamber (or electric rocket) to form a combustion gas that propels the launch vehicle through the main tube 305. The electrical energy used for combustion is delivered to the electrical combustion chamber from the conductive tubes forming the main tube 305 via the aligning arms and the sliding contacts.

In use, electrical energy passes from an electrical energy source (such as battery bank 341) via electrical lines. Electrical energy passes from the electrical lines to the outer conductive tube, passes to the sliding contact via the plasma arc contact and through the aligning arm to the electrical heater. The electrical path is completed by passage from the electrical heater through the aligning arm and the sliding contact to the inner conductive tube via the plasma arc contact. Propellant from the vehicle propellant tank is heated in the electrical heater and expanded through the nozzle to accelerate the launcher through the main tube 305 of the MAT 300. In such embodiments, propulsion can be characterized as proceeding via electric rocket propulsion powered by plasma-mediated electrical current conduction. Specifically, plasma-mediated conduction occurs at the plasma arc contact between the conductive tubes and the sliding contacts.

The launch vehicle 10 is thusly accelerated through the main tube 305 of the MAT using the force of hot expanding gas formed by electrical heating facilitated by tube-conducted electrical energy. More particularly, expansion of a light gas, solid, or liquid (for example, hydrogen, which can start in gas, liquid, or solid form) can be provided by heating the gas above 5,000 K and achieving an expelled gas consisting of individual atoms of hydrogen. In some embodiments, heating can be up to 100,000 K, which can result in the exhaust velocity being up to 77,000 m/sec. Launch velocity from the MAT can be as great as 150,000 m/sec or about two times the exhaust velocity. Maximum velocities can be limited to use in space since the practical limit for launch from the surface of the Earth is about 100,000 m/sec due to aerodynamic forces at that speed, which can reach about 1,000,000 PSI.

In some embodiments, the launcher 10 can comprise a payload (also called a glider, which can be a flight vehicle including a cargo hold), a propellant tank, an electrical heater, and an expansion nozzle, Optionally, the launcher can include one or more bearings that are configured to assist in aligning the launcher within the launch tube. In some embodiments, the launch vehicle 10 can comprise a High Acceleration Maxwell Rocket (HAMR).

After passage through the main tube 305, the launch vehicle 10 traveling through the MAT passes through the transition tube 310. Therein, gas at varying pressures can be injected to place preliminary aerodynamic forces on the launch vehicle 10 to test the proper function of the aerodynamic controls and guidance systems for the launch vehicle. For example, nitrogen gas from tank 320 can be pumped through pump 325 into the transition tube 310 at one or more points to achieve the desired pressure within the tube. In addition to the testing functions, the gas can be input at sufficient pressures to cause preliminary separation of the glider from the remaining portions of the launch vehicle 10, such as the propelling rocket and propellant tank.

Before exiting the launch system, the launch vehicle 10 passes through the exit portal 315, which can be configured to provide any one or more of the following benefits: smooth reliable separation of the glider from the remaining portions of the launch vehicle; free flight testing of a glider inside of the main tube; provision of flight instrumentation; smooth glider transition from the main tube to the atmosphere; smooth exit of the remaining portions of the launch vehicle following the glider; hydrogen venting; hydrogen equalization; and hydrogen shut off. The exit portal 315 can be substantially in the form of a tube an can be formed of similar construction and materials as used for the pre-accelerator tube 220. For example, the exit portal 315 can be a stainless steel tube or comprise further structural materials, such as other metal alloys, concrete, or the like.

In some embodiments, as illustrated in FIG. 9a and FIG. 9b, the exit portal 315 includes a plurality of valves, particularly a plurality of gate valves. As illustrated, the exit portal 315 includes a first gate valve 316 leading into the exit portal and a second gate valve 317 leading out of the exit portal. The second gate valve is thus positioned downstream from the first gate valve. The exit portal 315 can have a total length of about 0.1 to about 100 meters. If desired, however, the exit portal 315 length can be greater than 100 m. The first gate valve 316 and the second gate valve 317 can thus be positioned at or proximate either end of the tube forming the exit portal 315. Downstream of the second gate valve 317, the exit portal 315 further includes a membrane unit 318 formed of a membrane circumferential holder 318a and a membrane 318b stretched between the disk-shaped holder. Preferably, the membrane 318b is a thin, high strength flexible membrane such as, for example, Spectra fiber film, mounted on the disk-shaped holder that can be placed either manually or automatically over the atmospheric exit 315a of the exit portal 315.

In the illustration of FIG. 9a, the first gate valve 316 and the second gate valve 317 are both in the open position for illustrative purposes. When readied for launch, both of the first gate valve 316 and the second gate valve 317 are readied in the closed position, wherein the upper sections of each valve are lowered to engage the lower sections of each valve. Prior to launch, the second gate valve 317 is opened while the first gate valve 316 remains closed so that the pressure within the exit portal 315 is reduced from atmospheric pressure to an intermediate pressure between atmospheric pressure and the accelerator tube pressure of about 1 mBar. This can be achieved via remote control and can be effective to check the integrity of the membrane 318b. Specifically, if the membrane 318b fails due to a manufacturing defect, only the relatively short exit portal 315 is vented to atmosphere. In such an event, the membrane 318b is replaced until successful pressure standoff is obtained for a suitable period of time to assure reliable pressure standoff and sealing. Once the integrity of the membrane 318b is confirmed, the first gate valve 316 can be opened.

To assist in control of the launch vehicle through the PAT and/or the MAT, the launch vehicle can be configured for transmission of a telemetry signal down at least a portion of the PAT and/or the MAT. For example, prior to launch, and preferably continuously throughout the launch, the launch vehicle is transmitting the telemetry signal down the length of at least the MAT to the exit portal. This telemetry signal can contain complete vehicle health and status data, including, but not limited to, six-degrees of freedom (6DOF) telemetry, 6DOF rates, vibration, tank pressure, engine pressure, propellant flow, and all other relevant vehicle systems health and status data. The telemetry is preferably transmitted, for example, at 100 kHz rates (at least 100 MBPS data rate) on a carrier transmission frequency (GHz or optical) appropriately to penetrate any plasma sheath and transmit down the launch tube from the launch origination point to the exit portal. In some embodiments, if at any point the received data does not actively meet expectations, an exit portal control unit can initiate a shutdown sequence to the main launch control system, preferably within 100 microseconds (10 data packet cycles). The main launch control system (see element 91 in FIG. 2) can be configured with a default case that equal launch shutdown and, under such default configuration, actively nominal data reception is a requirement to avoid shutdown all through the launch sequence.

During passage of the launch vehicle through the MAT, the vehicle is accelerated by powering the electric rocket with an electrical current (I). Given that the tube section of the MAT has in inductance (L), stored magnetic energy in the MAT can be calculated by the following formula:

$$\text{Stored Magnetic Energy} = 0.5 \times L \times I^2.$$

In a typical, exemplary embodiment, the current can be in the range of about $2 \times E^6$, and L can be in the range of about $3 \times E^{-5}$. Based on the above formula, the stored energy can be in the range of about 60 Megajoules. This is a surprisingly low level of stored energy because the presently disclosed systems are configured specifically so that the launch system exhibits low inductance. By contrast, in a parallel rail configuration according to the known art, L would be expected to be approximately 100 fold larger, and the stored energy would thus be expected to be in the range of approximately 6,000 Megajoules.

Although the present systems and methods provide significantly lower levels of stored energy in the launch tube, it can be beneficial to provide elements for removal of that energy at one or more points along the length of the MAT. For example, one or more resistors (e.g., muzzle switches) can be provided to slowly and controllably dissipate the stored magnetic energy as heat, rather than explosively as a massive arc at the end of the launch tube. Shortly before the launch vehicle reaches the exit portal, the main launch control system can be configured to depower the MAT and close the MAT muzzle switches. As the launch vehicle flies out of the powered section of the MAT (e.g., the main tube 305), the glider portion of the flight vehicle is separated from the remaining portions of the vehicle. Such separation can occur in one or both of the transition tube 310 and the exit portal 315.

The exit portal 315 can include one or more receiver stations 3151 configured for receiving the launch vehicle telemetry transmissions discussed above. An on-board data system provided with the launch vehicle can accurately measure the status of the glider and continue to transmit it to the one or more receiver stations 3151. As the glider enters the exit portal 315, the one or more receiver stations 3151 can provide detailed diagnostic data to verify the glider status.

As described in relation to FIG. 9a and FIG. 9b, the glider portion of the launch vehicle penetrates the membrane 318b at the end of the exit portal 315 and transitions from the intermediate pressure in the exit portal to atmospheric pressure. Shortly after exit of the glider portion of the launch vehicle, the remaining portions of the launch vehicle (e.g., the propellant tank and the rocket motor) pass out of the exit portal. The inherent aerodynamic instability of these remaining portions of the launch vehicle causes them to tumble and disintegrate within about a kilometer due to aerodynamic forces and heating. After exit of the launch vehicle from the exit portal, hydrogen venting can occur for a limited duration of time (e.g., for a matter of only a few seconds up to as much as a few minutes). As illustrated in FIG. 10, one or more pyrotechnic devices 3152 can be positioned proximate to the atmospheric exit 315a of the exit portal 315 to provide for ignition and burning of any venting hydrogen immediately upon exit from the atmospheric exit. Near the end of this venting process, the first gate valve 316 and the second gate valve 317 are closed so as to prevent ingress of air into the exit portal 315 or the main tube 305. Thereafter, the main tube 305 can be pumped down to the desired, low pressure state of about 1 mBar. Following pump down, tube examination is begun with the bore riding sensor system, any necessary repairs are completed, and the tube pressure is maintained thereafter at about 1 mBar.

The length of the PAT and the MAT can vary as desired. In one or more embodiments, the PAT can have an overall length of at least 100 m, at least 500 m, or at least 1,000 m. In certain embodiments, the overall PAT length can be about 100 m to about 10,000 m, about 200 m to about 5,000 m, or about 500 m to about 3,000 m. The MAT can have an overall length of at least 2,000 m, at least 5,000 m, at least 10,000 m, or at least 20,000 M. In certain embodiments, the overall MAT length can be about 5,000 m to about 50,000 m, about 10,000 m to about 40,000 m, or about 15,000 m to about 35,000 m.

The launch system 100 can be configured to transmit necessary ranges of electrical current while generating or inducing a magnetic field at a strength of less than about 1.25 Tesla, less than about 1 Tesla, less than about 0.5 Tesla, less than about 0.25 Tesla, or less than about 0.2 Tesla. In some embodiment, magnetic field can be limited to a strength of about 0.2 Tesla to about 1.2 Tesla.

In one or more embodiments, the present launch system can be utilized for testing purposes separate from the launch of a dedicated cargo. For example, launch of vehicles from the PAT into flight tubes can be done for hypersonic testing with or without added acceleration via an electric rocket in a MAT. The example of direct injection with electric rocket boost is illustrated in FIG. 11a. As illustrated therein, a vehicle 11 supported in a vehicle holder 11a is accelerated through the pre-accelerator tube 220 utilizing a pusher plug 380 in place of the propellant tank and rocket motor that would otherwise be used to propel the launch vehicle through the MAT 300. The pusher plug 380 is separated from the or model (or test vehicle) well prior to entering the test section so that aerodynamic measurements will not be affected by the pusher plug.

The launch vehicle or model can be mounted on a fixed or articulated sting to move the vehicle forward while avoiding any interfering aerodynamic effects of support struts. The articulated sting can have multiple degrees of freedom and multiple joints to allow aero maneuvers in the flight tests. Actuators and gas jet interaction thrusters and other known means of control known to those skilled in the art can enable the vehicle to move in all degrees of freedom. As illustrated in FIG. 11b, the vehicle 11 is supported by a plurality of struts 12 attached to a hollow cylinder 13 that has an outer diameter that is substantially close to the inner diameter of the pre-accelerator tube 220. As an illustrative example, the pre-accelerator tube 220 can have an inner diameter of about 2 m (e.g., about 1 m to about 10 m, about 1 m to about 5 m, or about 1.5 m to about 4 m. The outer diameter of the hollow cylinder preferably is less than the inner diameter of the pre-accelerator tube by about 1% to about 10%, about 1% to about 8%, or about 2% to about 5%.

After leaving the PAT 200, the launch vehicle 10 flies through the test tube where aerodynamic measurements are made. After this, is often desirable to slow the vehicle down and recover it in a reliable manner. Various methods can be used for achieving this end. For example, the launch system can include a soft catch system according to one or more embodiments.

In some embodiments, as illustrated in FIG. 12, a soft catch system, a density gradient can be provided along a defined distance through a tube using cold, constant pressure gas with varying atomic or molecular weights. In FIG. 12, a soft catch system 500 includes a soft catch flight tube 505 that is enclosed inside a larger vent tube 510. The soft catch flight tube 505 includes three gas sections (511a, 511b, 511c) that differ based on one or more of composition, molecular weight, temperature, and density at constant pressure. The soft catch flight tube 505 also includes one or more vents 512 of suitable sizes and locations to allow gases from within the soft catch flight tube to vent out into the open interior of the vent tube 510. The vents 512 are provided to vent the shock induced overpressure from in front of the vehicle 11 to maintain desired deceleration profiles. This improves on the prior art in that the deceleration is lower and more constant than the prior art. The number and location of vents 512 can be based upon the gas present in a given section. For example, as illustrated, a greater number of vents 512 are present in the area of gas section 511*c* as compared to gas section 511*b* and gas section 511*a*. The gas sections are separated from a lower pressure test section 511*d* by a thin sealing membrane 515. A passive cushion 520 is positioned behind the gas sections and can include any cushioning material such as a variable density foam. Positioned behind the passive cushion 520 is an active cushion 525. In the illustrated embodiment, the active cushion 525 is a recoil piston. The active cushion 525 sits against a backstop 530, which can function as a recoil mass, a foundation, and/or an emergency stop. An entry portal 535 is provided in the soft catch system 500 to allow for entry of personnel for retrieving the vehicle and/or routine maintenance.

A further exemplary soft catch system 600 is illustrated in FIG. 13. Therein, the soft catch flight tube 605 includes an ablative conical ramp 607 present along a portion of the length of the tube. An active cushion 625 is again present along with a backstop 630. A passive cushion may also be present if desired. In this embodiment, the nose and leading edges of the vehicle 11 are subjected to significantly less aerothermal heating and potential ablation compared to other soft catch systems. The forces are exerted only on the edges of the ablative conical ramp 607 and gas bearing bands 609 present on the vehicle holder 11*a*. The vehicle 11 is only subjected to vacuum and deceleration forces. The ablative conical ramp 607 can be applied to the soft catch flight tube 605 using any suitable method. As illustrated in FIG. 14*a* and FIG. 14*b*, a mechanized method can be used to apply the ablative conical ramp 607 used to decelerate the vehicle. The ablative conical ramp 607 is formed by spraying the desired ablative material or materials on the inside of the soft catch flight tube 605. Non-limiting examples of suitable materials for forming the ablative conical ramp 607 include polyethylene, water, argon, and combinations thereof. The soft catch flight tube 605 may be cooled so the applied material(s) will solidify as contact occurs. In the illustrated embodiment, a sprayer 640 moves longitudinally along the soft catch flight tube 605 on one or more guide rails 641. The sprayer can be a rotating bore riding sprayer that translates along the length of the soft catch flight tube 605 while rotating to spray the ablative material onto the inside surface of the wall of the soft catch flight tube.

The function of the ablative material is illustrated in FIG. 15. Specifically, the vehicle holder 11*a* includes a leading edge scraping ramp 11*b*. Each gas bearing band 609 is located within a recess 11*a*' formed in the vehicle holder 11*a*. As the gas bearing band 609 drags along the ablative conical ramp 607, a high pressure, high drag gas bearing 660 is formed from the ablating materials. Choice of ablative ramp material, thickness, and ramp angle can be varied to achieve the desired deceleration profile.

Use of low pressure, low drag gas bearings has been believed to be impossible because of high drive pressure that would be expected to blow through low pressure bearings. According to the present disclosure, low (e.g., down to and including zero) drive pressure is utilized and would not be expected to blow through the low pressure bearings. As discussed above, low pressure gas bearings can be formed circumferentially around the accelerated object in the PAT and MAT by encircling the projectiles with multiple "O-Ring" like plastic bands and/or by injection of gas into the region between the accelerating projectile and the MAT or PAT drive tube. Although this is discussed above in relation to the soft catch system, it is understood that the formation of gas bearings can be applied to the launch vehicle during passage through any single section of the PAT and/or the MAT as described herein or in any combination of sections of the PAT and MAT. Although the pressure wave that is formed by the release of pressure from the pre-acceleration chamber by the de-pressurization of the valve section can be significantly high, the pressure wave likewise can exhibit a rapid decrease in intensity as it moves along the PAT. For example, by the time the launch vehicle reaches the end of the PAT, the pressure behind the launch vehicle can decrease by a factor of about 2, by a factor of about 5, by a factor of about 8, by a factor of about 10, by a factor of about 15, or by a factor of about 20. Moreover, despite the significant length of the PAT, the acceleration of the launch vehicle by the pressure wave is sufficiently significant so that the launch vehicle can traverse the distance in a time of less than 30 seconds, less than 15 seconds, less than 10 seconds, less than 5 seconds, or less than 2 seconds. As an exemplary embodiment, a typical pressure for the gas exiting the pre-acceleration chamber through the valve section can be approximately 360 PSI, and the pressure can drop to approximately 40 PSI as the launch vehicle traverses the distance of the PAT in a time of approximately 1 second.

Embodiments of yet a further soft catch system 700 are illustrated in relation to FIG. 16*a* through FIG. 16*c*. The soft catch system 700 includes a soft catch flight tube 705 with a plurality of decelerating troughs 770 attached along a length of the soft catch flight tube. In further embodiments, at least one trough 770 an be positioned along at least a portion of the length of the flight tube 705. In these embodiments, the pusher plug 380 includes a plurality of arms 381 that rapidly extend from the base of the pusher plug and engage the decelerating troughs 770 attached on the outside of the soft catch flight tube 705. The decelerating troughs 770 can be filled an ablative material 707, and the arms 381 can include gas bearing bands 709 thereon. This enables the same gas bearing generator bands as all other testing to be used in this soft catch system. The troughs can be filled and profiled in the same manner as in the above-described soft catch system, with materials such as polyethylene, water, and argon in solid form. In FIG. 16*b*, the arms 381 are in the retracted mode during the test flight of the vehicle 11. In FIG. 16*c*, the arms 381 are in the extend mode for soft catch deceleration.

In one or more embodiments, the PAT can have an alternate arrangement as otherwise described above. Beneficially, any PAT according to the present disclosure can be configured for providing rapid launch rates and/or very high heating temperatures. In the embodiment illustrated in FIG. 17, the PAT can be configured for achieving either or both of these advantages.

As illustrated in FIG. 17, the PAT 2000 comprises an accelerator tube 2200 with an optional cooling system 2900 surrounding at least a portion thereof. Instead of including a dedicated pressure vessel, the accelerator tube 2200 can be configured for containing a gas for at least a time at a pressure as otherwise described herein for rapid acceleration of a launch vehicle 2010. As illustrated in FIG. 17, at least a rear portion 2201 of the launch tube 2200 is of increased thickness to accommodate the increased pressures proximate the rapidly expanding gas 2903.

The accelerator tube 2200 includes a breech section 2990 that encompasses a gas chamber 2000a and a heater chamber 2000b. The gas chamber 2000a and the heater chamber 2000b can optionally be separated by a frangible seal 2904. Moreover, a second frangible seal 2905 can optionally be present to separate the heater chamber 200b from the downstream section of the accelerator tube 2200. A heater element 2902 can be movably positioned within or around the heater chamber 2000b to facilitate rapid heating of the gas 2903. As such, the PAT 2000 comprises a gas chamber 2000a that initially includes a cold light gas, liquid, or solid 2903 and an externally or internally heater element 2902 that can be pre-heated and then rapidly introduced into a breech region 2990 defined by the gas chamber 2000a and a heater chamber 2000b. The cold light gas, liquid, or solid 2903 then comes rapidly into contact with heater element 2902 and is thereby rapidly heated to a temperature sufficient to accelerate a vehicle 2010 to a desired high velocity.

The cold light gas, liquid, or solid 2903 and the heater element 2902 can be introduced into the breech region 2990 by a variety of methods as will be recognized by those skilled in the art. For example, one or both may be introduced from the breech end, from the sides of the breech region 2990, or from the front of the breech region. Heater element 2902 is a separate element that can be introduced rapidly so that it may conveniently remain in a very cold state until the launch process is desired to start. The cold light gas, liquid, or solid 2903 likewise may remain separate from the gas chamber 2000a and then introduced rapidly so that it may conveniently remain in a very hot state until the launch process is desired to start.

The optional frangible seal 2904 may be present to facilitate separation of the gas chamber 2000a and the heater chamber 2000b until the moment of desired launch. Launch can then initiated by rupture of the frangible seal 2904 due to passive pressure effects or due to active methods such as electrical heating or explosive effects. A further, optional frangible seal 2905 may be present to facilitate separation of the breech region 2990 from the accelerator tube 2200 until the moment of desired launch. Launch can then initiated by rupture of the frangible seal 2905 due to passive pressure effects or due to active methods such as electrical heating or explosive effects.

An optional cooling system 2900 may surround or be incorporated as part of the breech region 2990 in particular to prevent the temperature of the breech region from rising above a desired level. The cooling system 2900 may extend past the breech region 2990 as desired to provide cooling to part or all of the accelerator tube 2200 as well. Operating pressures, temperatures, accelerations, gravitational forces, and velocities as otherwise described herein in relation the PAT can apply to the embodiment of FIG. 17 as well. Likewise, it is understood that the vehicle 2010 accelerating through the accelerator tube 2200 can pass into an MAT 300 as otherwise described herein, an exit portal 315 as otherwise described herein, or a soft catch system (500, 600, 700) as otherwise described herein.

In one or more embodiments, the present disclosure thus relates to a PAT comprising an accelerator tube including a breech region configured for receiving a light gas, liquid, or solid and configured for receiving a pre-heated heating element configured to rapidly heat the light gas, liquid, or solid. The breech region can comprise one or more frangible seals in the breech region. The breech region can comprise a gas chamber where the light gas, liquid, or solid, is heated to ultimately provide a pressurized, heated gas and can comprise a separate heater region. The heater can be input inside of the heater region or can be positioned externally to the accelerator tube in the heater region. The gas chamber can be separated from the heater chamber by a frangible seal. The heater chamber can be separated from a downstream portion of the accelerator tube by a frangible seal. A cooling system can be configured around at least a portion of the accelerator tube, preferably in the region of the gas chamber or at least around the breech region.

Various combinations of embodiments of soft catch systems may beneficially be used in certain applications by those skilled in the art. In addition, by using superconducting technology, electromagnetic means may used instead of fluid dynamic means to decelerate the vehicle.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. A launch system for launch of a vehicle, the launch system comprising:
 a preliminary accelerator tube system (PAT) including:
 a pre-acceleration chamber configured as a pressure vessel comprising at least an outer, structural support layer, the pressure vessel defining an open interior configured to receive a gas therein;
 a heating system that is configured to heat the pre-acceleration chamber and thus heat the gas received therein;
 a valve assembly downstream of the pre-acceleration chamber and in fluid communication therewith, the valve assembly including at least one pressure-releasable valve; and
 a pre-accelerator tube downstream of the valve assembly and in fluid communication therewith, the pre-accelerator tube being configured to contain the vehicle;
 wherein opening of the at least one pressure-releasable valve of the valve assembly creates a pressure wave sufficient to accelerate the vehicle through the pre-accelerator tube.

2. The launch system of claim 1, wherein the pre-acceleration chamber is configured for reverse longitudinal movement relative a direction in which the vehicle is accelerated through the pre-accelerator tube.

3. The launch system of claim 2, further comprising one or more recoil control elements associated with the pre-acceleration chamber.

4. The launch system of claim 1, wherein the pre-acceleration chamber is positioned atop one or more supports configured to stabilize the longitudinal movement of the pre-acceleration chamber.

5. The launch system of claim 1, wherein the pressure vessel further comprises an insulating layer interior to the outer, structural support layer.

6. The launch system of claim 1, wherein the heating system further comprises an internal heating system that is configured to heat the gas.

7. The launch system of claim 1, wherein the pre-acceleration chamber comprises one or more feed-through passages extending therethrough and comprises one or more electrical contacts positioned within the feed-through passages, wherein the one or more feed-through passages are electrically insulated and pressure sealing.

8. The launch system of claim 1, wherein the heating system is an external heating system that is separate from the pressure vessel.

9. The launch system of claim 1, wherein the valve assembly comprises an elongated tube with an entry valve and an exit valve, wherein one or both of the entry valve and the exit valve is a pressure-releasable valve.

10. The launch system of claim 9, wherein one or both of the entry valve and the exit valve of the valve assembly includes a burst disk.

11. The launch system of claim 9, wherein the valve assembly comprises an interconnecting line and valve configured for one or both of inflow and outflow of gas from the valve assembly.

12. The launch system of claim 1, further comprising a pre-accelerator loader positioned downstream of the valve assembly and upstream of the pre-accelerator tube, the pre-accelerator loader being configured for loading the vehicle into the PAT.

13. The launch system of claim 12, wherein the pre-accelerator loader comprises at least a tube segment that is translatable between a position of alignment with the valve assembly and the pre-accelerator tube and a position out of alignment with the valve assembly and the pre-accelerator tube.

14. The launch system of claim 1, further comprising a gas stripper tube positioned downstream of the pre-accelerator tube, wherein the gas stripper is configured for withdrawal of gas therefrom.

15. The launch system of claim 1, further comprising an exit portal including a plurality of gate valves.

16. The launch system of claim 15, wherein the exit portal further includes a membrane unit positioned downstream from the plurality of gate valves.

17. The launch system of claim 1, further comprising a main accelerator tube system (MAT) positioned downstream of the PAT.

18. The launch system of claim 17, wherein the MAT comprises a main tube that is formed at least of two concentric, conductive tubes, the main tube being configured for delivery of electrical energy to the vehicle.

19. A method for launching a vehicle, the method comprising:
adding a pressurized gas into a pressure vessel until a preliminary pressure is achieved;
heating the pressure vessel so that the gas is heated and achieves a propagation pressure that is greater than the preliminary pressure by at least a factor of 2; and
adjusting a pressure in a valve assembly that comprises at least one pressure-releasable valve, the valve assembly being positioned downstream of the pressure vessel and being in fluid communication therewith via the pressure-releasable valve, wherein the adjusting of the pressure in the valve assembly is sufficient to open the at least one pressure-releasable valve;
wherein the opening of the at least one pressure-releasable valve causes the gas from the pressure vessel to pass through the valve assemble and accelerate the vehicle positioned downstream from the valve assembly.

20. The method of claim 19, wherein the preliminary pressure is at least 2 bar.

21. The method of claim 19, wherein the pressurized gas is heated in the pressure vessel to a temperature of about 500 K to about 3,000 K.

22. The method of claim 19, wherein prior to said adjusting, the pressure in the valve assembly is less than the pressure in the pressure vessel and is greater than a pressure where the vehicle is positioned downstream from the valve assembly.

23. The method of claim 22, wherein the pressure where the vehicle is positioned downstream from the valve assembly is less than 1 bar.

24. The method of claim 19, wherein the at least one pressure-releasable valve comprises a burst disk.

25. The method of claim 19, wherein the gas passing from the pressure vessel is sufficient to accelerate the vehicle to a velocity of at least 1,000 m/s.

26. The method of claim 19, further comprising passing the vehicle through an exit portal including a plurality of gate valves.

27. The method of claim 26, wherein the exit portal further includes a membrane unit positioned downstream from the plurality of gate valves.

28. The method of claim 26, further comprising passing the vehicle to a soft catch system comprising:
a flight tube configured for longitudinal movement therethrough of the vehicle; and
at least one component present within the flight tube configured to decelerate the vehicle.

29. The method of claim 19, further comprising passing the vehicle through a main accelerator tube system (MAT) that includes a main tube that is formed at least of two concentric, conductive tubes, the main tube being configured for delivery of electrical energy to the vehicle.

30. The method of claim 19, wherein the propagation pressure within the pressure vessel is a maximum of 10,000 PSI.

* * * * *